(12) United States Patent
Maeda

(10) Patent No.: US 6,199,392 B1
(45) Date of Patent: Mar. 13, 2001

(54) AIR CONDITIONING SYSTEM

(75) Inventor: Kensaku Maeda, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/381,802

(22) PCT Filed: Mar. 25, 1998

(86) PCT No.: PCT/JP98/01311

§ 371 Date: Sep. 24, 1999

§ 102(e) Date: Sep. 24, 1999

(87) PCT Pub. No.: WO98/43024

PCT Pub. Date: Oct. 1, 1998

(30) Foreign Application Priority Data

Mar. 25, 1997 (JP) .................................................... 9-090241
Mar. 25, 1997 (JP) .................................................... 9-090242

(51) Int. Cl.[7] .................................................... F25D 17/00
(52) U.S. Cl. .............................. 62/180; 62/94; 62/196.4; 62/228.3; 62/271; 165/6; 165/8
(58) Field of Search .................................. 62/238.3, 271, 62/94, 180, 181, 182, 183, 196.4, 428, 429, 507; 165/6, 8

(56) References Cited

U.S. PATENT DOCUMENTS

| | | | |
|---|---|---|---|
| 4,180,985 | * 1/1980 | Northrup, Jr. | 62/94 |
| 4,594,860 | * 6/1986 | Coellner et al. | 62/271 |
| 4,887,438 | 12/1989 | Meckler | 62/271 |
| 5,325,676 | 7/1994 | Meckler | 62/93 |
| 5,364,455 | 11/1994 | Komarneni et al. | 95/117 |
| 5,448,895 | 9/1995 | Coellner et al. | 62/94 |
| 5,502,975 | * 4/1996 | Brickley et al. | 62/94 |
| 5,579,647 | * 12/1996 | Calton et al. | 62/94 |
| 5,718,122 | 2/1998 | Maeda | 62/185 |
| 5,758,509 | 6/1998 | Maeda | 62/94 |
| 5,761,923 | 6/1998 | Maeda | 62/271 |
| 5,761,925 | 6/1998 | Maeda | 62/476 |
| 5,791,157 | 8/1998 | Maeda | 62/483 |
| 5,816,065 | 10/1998 | Maeda | 62/271 |
| 5,931,015 | 8/1999 | Maeda | 62/271 |
| 5,943,874 | 8/1999 | Maeda | 62/271 |
| 5,950,442 | 9/1999 | Maeda | 62/175 |
| 5,950,447 | 9/1999 | Maeda et al. | 62/271 |
| 5,966,955 | * 10/1999 | Maeda | 62/238.3 |
| 6,003,327 | * 12/1999 | Belding et al. | 62/271 |
| 6,018,953 | * 2/2000 | Belding et al. | 62/94 |

FOREIGN PATENT DOCUMENTS 2 357 828   2/1978   (FR) .
WO 96/23185   8/1996   (WO) .

* cited by examiner

*Primary Examiner*—Corrine McDermott
*Assistant Examiner*—Marc Norman
(74) *Attorney, Agent, or Firm*—Armstrong, Westerman, Hattori, McLeland & Naughton, LLP

(57) ABSTRACT

An energy conserving air conditioning system having a superior dehumidification capacity has been developed, by raising the processing temperature of regeneration air for regenerating a desiccant material in a desiccant-assisted air conditioning system. The air conditioning system comprises: a process air passage (A) for flowing process air; a regeneration air passage (B) for flowing regeneration air; a desiccant device (103) which can be selectively communicated with either the process air passage or the regeneration air passage; and a heat pump device for supplying a heating heat for regenerating the desiccant device (103) to the regeneration air. The heat pump device has a compressor (260) and is workable on process air as a low temperature heat source and regeneration air as a high temperature heat source. Superheated vapor of a compressed refrigerant flowing out from the compressor (260) is used to heat a portion of regeneration air in the regeneration air passage upstream of the desiccant device.

13 Claims, 15 Drawing Sheets

[DETAILED ILLUSTRATION OF DESICCANT WHEEL]

[DETAILED ILLUSTRATION OF DESICCANT WHEEL]

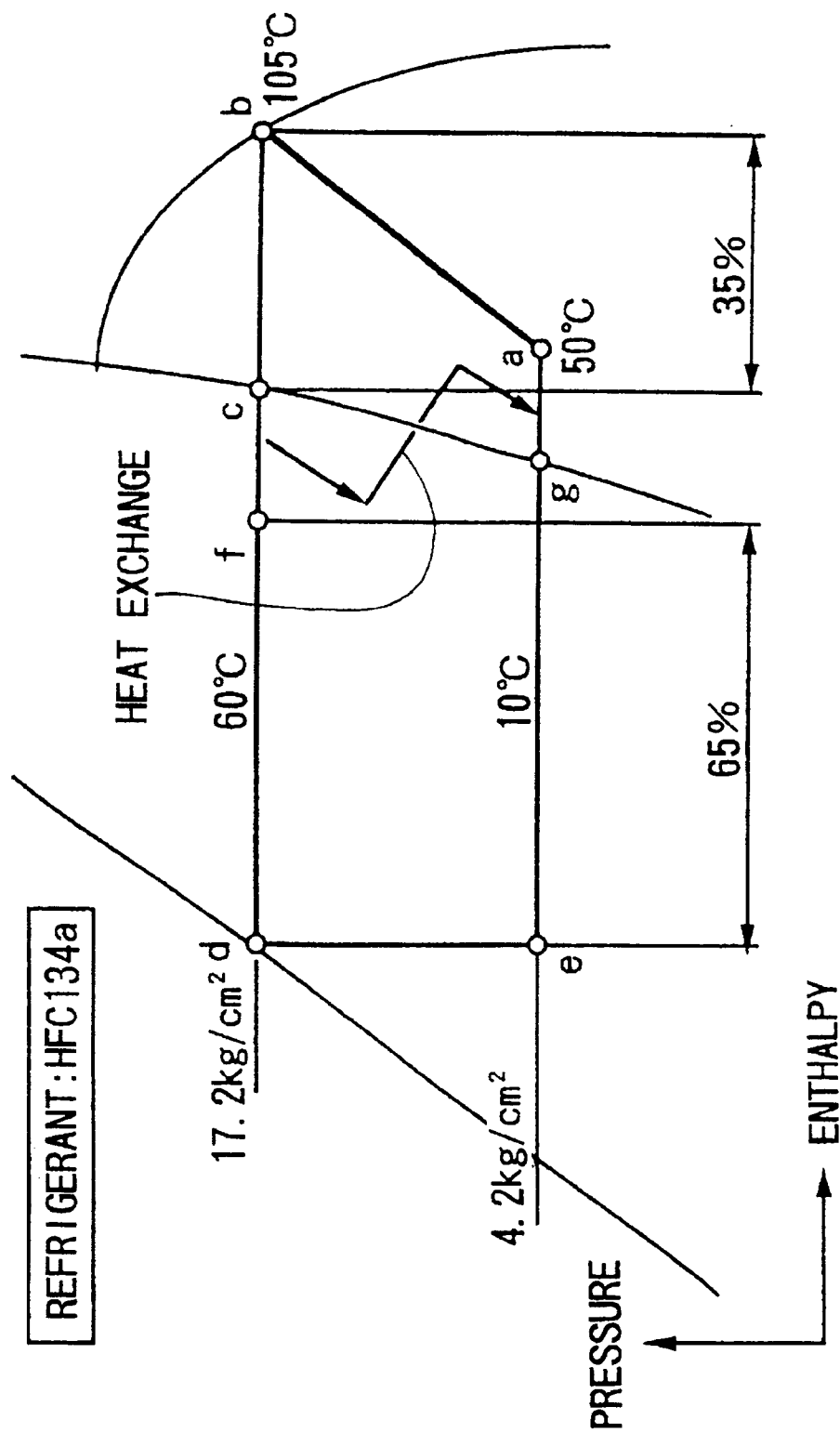

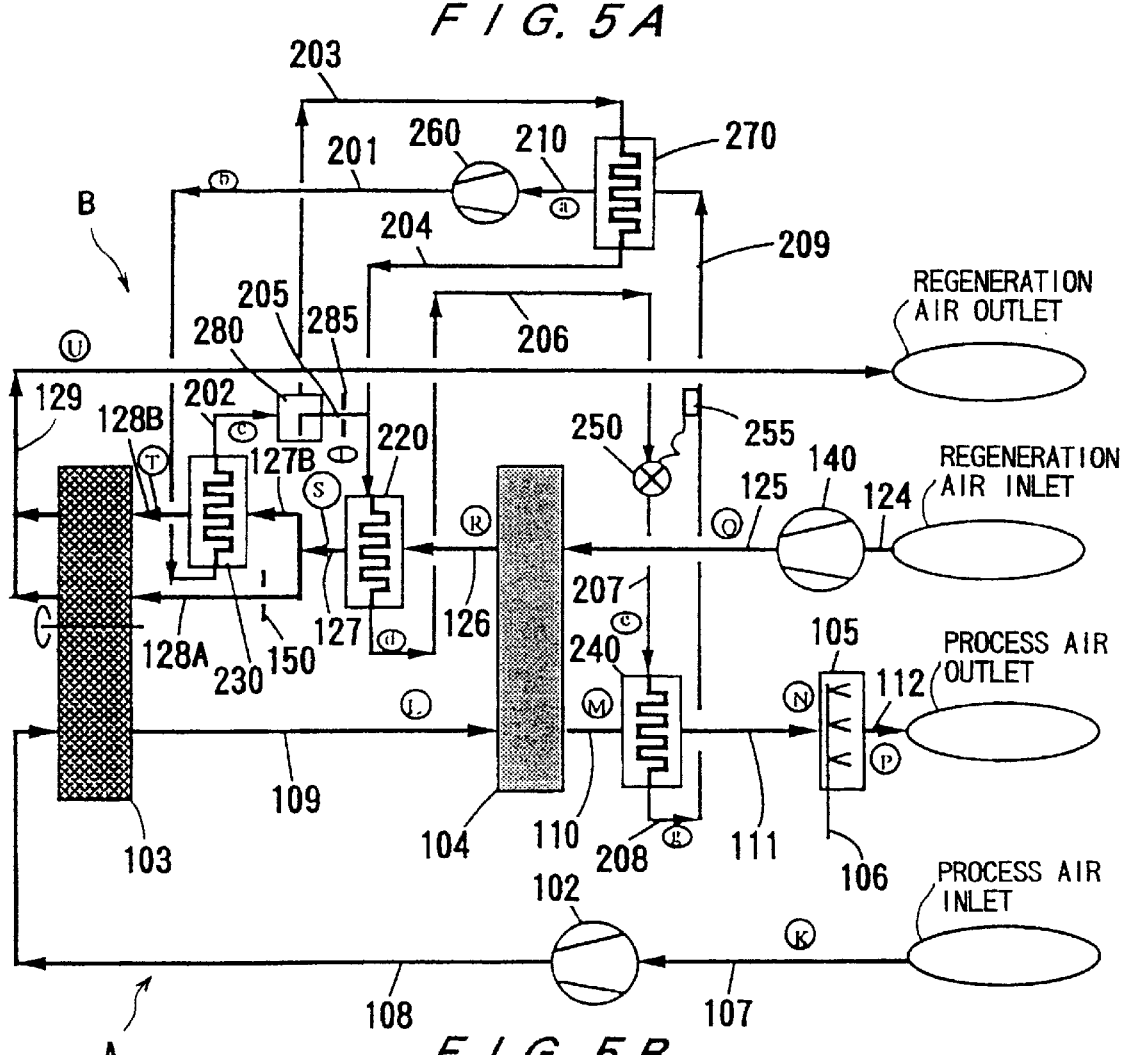
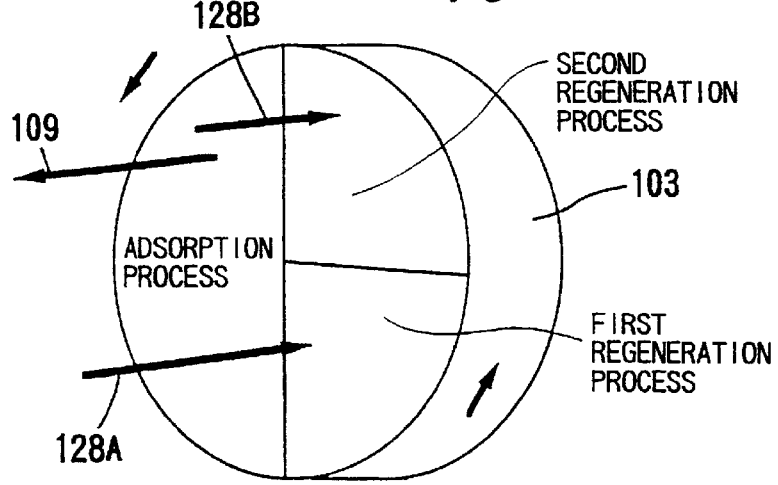
[DETAILED ILLUSTRATION OF DESICCANT WHEEL]

F I G. 7
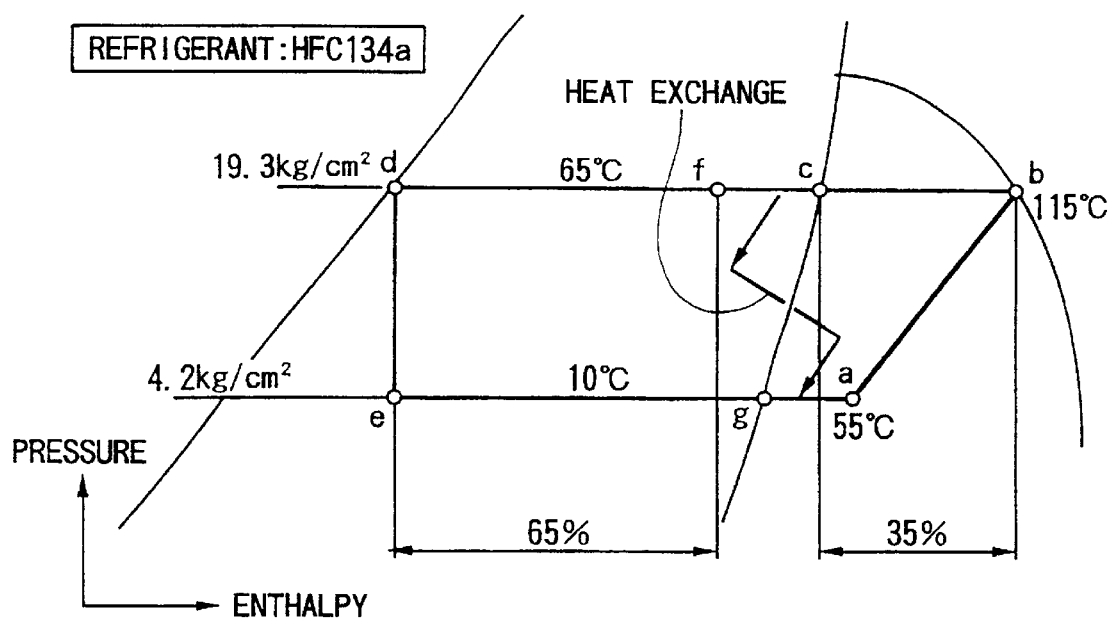

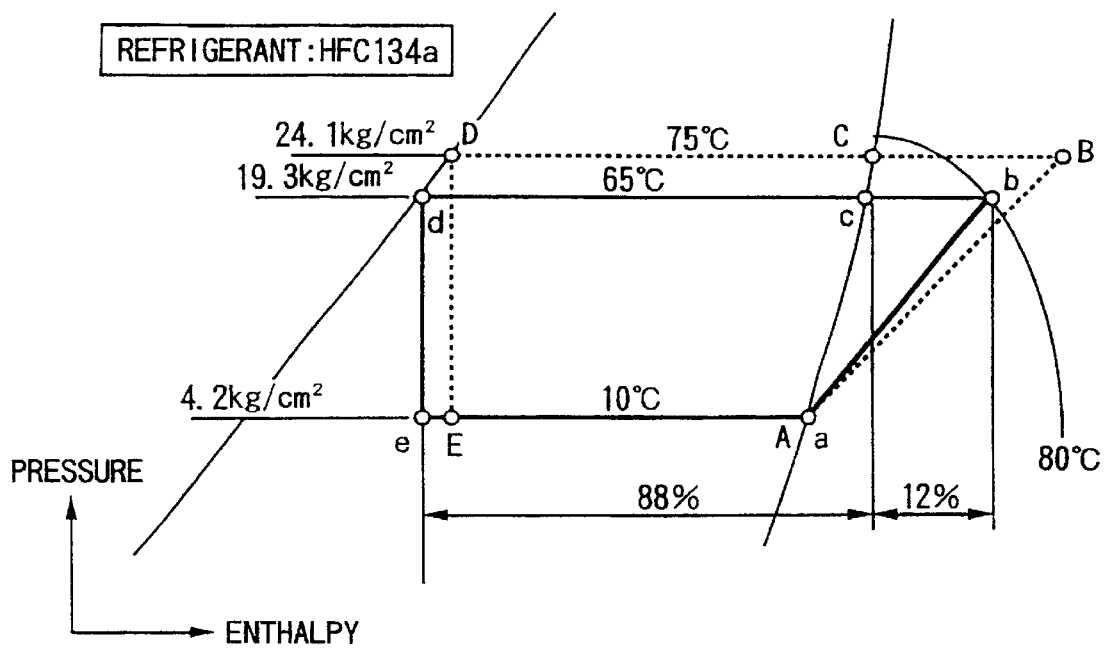
F I G. 14

AIR CONDITIONING SYSTEM

TECHNICAL FIELD

The present invention relates in general to air conditioning systems, and relates in particular to a desiccant assisted air conditioning system utilizing a heat pump device or a refrigeration device for desiccant regeneration and cooling of process air.

BACKGROUND ART

FIG. 11 is an example of prior art disclosed in a U.S. Pat. No. 4,430,864 and comprises: a process air passage A; a regeneration air passage B; two desiccant beds 103A, 103B; and a heat pump device 200 for desiccant regeneration and cooling of process air. The heat pump device 200 is provided with two heat exchangers embedded in the two desiccant beds 103A, 103B, one of the desiccant bed is used as a high/low temperature heat source. One of the desiccant beds is used to flow process air to carry out dehumidification, and the other desiccant bed is used for flowing regeneration air to carry out desiccant regeneration. After these processes have been carried out for sometime, regeneration air and process air are switched by means of switching valves 105, 106 to carry out reverse steps.

In the technology described above, the high/low temperature sources and the desiccant devices are integrated into one unit respectively, and an amount of heat corresponding to the cooling effect ΔQ for the air conditioning system becomes a thermal load on the heat pump (refrigerating machine). The thermal efficiency of the entire system is thus limited by the capacity of the heat pump, and no extra effect is achieved within the system. Therefore, it may be concluded that complexity of the system is not worth the effort.

To resolve such a problem, the following type of arrangement may be considered. That is, as shown in FIG. 12, a high temperature source 220, is disposed in the regeneration air passage to heat the regeneration air, while a low temperature heat source 210 is disposed in the process air passage to cool the process air. Also, a heat exchanger 104 may be provided for transferring sensible heat between post-desiccant process air the pre-desiccant regeneration air. In the example shown, the desiccant device is a desiccant wheel 103 rotatable to traverse the process air passage A and the regeneration air passage B.

In such a system, as shown in a psychrometric chart in FIG. 13, total cooling effect (ΔQ) of a cooling effect produced by the sensible heat exchanger added to the cooling effect (A q) provided by the heat pump device may be obtained for the entire system, thus resulting in a higher thermal efficiency and a more compact design of the entire system than the system shown in FIG. 11.

The heat pump used for this purpose requires a high-temperature heat source of over 65° C. for desiccant desorption and a low-temperature heat source of about 10° C. that for cooling the process air. FIG. 14 shows a Mollier diagram of a refrigerant, HFC134a, in a vapor compression refrigeration cycle operated by such high-temperature and low-temperature sources. As shown in FIG. 14, the amount of temperature rise by the heat pump is 55° C. such that the pressure ratio and the compressor power are almost the same as the heat pump for conventional air conditioners based on the HCFC22 refrigerant, therefore, it may be possible to use a compressor designed to use HCFC22 in the heat pump of a desiccant-assisted air conditioning system. There is a further possibility that, by using the sensible heat of the superheated vapor (80° C. in the diagram) at the compressor outlet, the desiccant regeneration air can be heated to a temperature higher than the condensation temperature.

However, even in such an air conditioning system, heat utilization leaves much room for improvement, because of the relationship shown in FIG. 15 between the changes in the refrigerant, the desiccant regeneration air and enthalpy when all of the regeneration air is passed through the high-temperature heat exchanger of the heat pump shown in FIG. 12. It can be seen from FIG. 15 that, assuming a thermal efficiency of 80% for the transfer of condensation heat in the high-temperature heat exchanger 220, the temperature of regeneration air is raised by about 20° C. from 40 to 60° C. However, the heating ability of superheated vapor in the heat pump is only 12% of the total heating ability of the heat pump, as indicated in FIG. 14, therefore, when the regeneration air is heated with this remaining 12%, the temperature rise that can be expected is only about:

$$(20° C./0.88) \times 0.12 \times 2.7° C.$$

The result is that, the sensible heat of the superheated vapor from the compressor outlet can hardly contribute to raising the regeneration air temperature, and the system is forced to carry out desiccant desorption at a temperature (62.7° C. in the diagram) which is lower than the refrigerant condensation temperature. When a desiccant material such as silica gel is used, there is a tendency that the higher the temperature of regeneration air the higher the dehumidification capacity of the regenerated desiccant up to about 90° C. regeneration temperature. Therefore, the higher the temperature of the regeneration air the higher the processing capability of a desiccant-assisted air conditioner for processing latent heat, and the cooling capacity of the system is improved. If it is attempted to raise the condensation temperature of a refrigerant to about 75° C. in order to achieve such a purpose of raising the desiccant desorbing temperature, the refrigeration cycle of the system is disturbed to a dotted line shown in FIG. 14 such that the condensation pressure required becomes abnormally high (24.1 kg/cm²), and consequently, a compressor designed for HCFC22 can no longer be used as a compressor for a heat pump in a desiccant-assisted air conditioning system and a compressor of a higher compressor power leads to a lower coefficient of performance.

DISCLOSURE OF INVENTION

It is an object of the present invention to provide an energy conserving air conditioning system having a superior dehumidification capacity, by raising the processing temperature of regeneration air for regenerating a desiccant material in an desiccant-assisted air conditioning system.

The object has been achieved in air conditioning system comprising: a process air passage for flowing process air; a regeneration air passage for flowing regeneration air; a desiccant device which can be selectively communicated with either the process air passage or the regeneration air passage; and a heat pump device for supplying a heating heat for regenerating the desiccant device to the regeneration air, the heat pump device having a compressor and workable on process air as a low temperature heat source and regeneration air as a high temperature heat source, wherein superheated vapor of a compressed refrigerant flowing out from the compressor is used to heat a portion of regeneration air in the regeneration air passage upstream of the desiccant device. By heating a portion of regeneration air with superheated vapor, not a large amount of the regeneration air, the heat capacity of the regeneration air used for moisture desorption is lowered so that a large sensible heat change can be introduced, resulting that a small amount of superheated vapor at relatively high temperature is used effectively to heat the regeneration air to desorb moisture from the desiccant device.

The system may also be arranged so that the desiccant device is communicable with at least a first passage region for performing dehumidification of the process air, a second passage region for performing a first regeneration process of the desiccant device and a third passage region for performing a second regeneration process of the-desiccant device, and the desiccant device is designed so that a desiccant material sequentially passes the first, second and third passage regions; that the high temperature heat source of the heat pump device is comprised by at least two heat exchangers so that the outflowing refrigerant from the compressor flows successively from the first high temperature heat exchanger into the second high temperature heat exchanger; that regeneration air, after flowing through the second high temperature heat exchanger, is split into two passages so that a portion of the regeneration air flows through one passage into the second passage region to perform the first regeneration process, and remaining portion of the regeneration air, after flowing through the first high temperature heat exchanger, passes through other passage into the third passage region to perform the second regeneration process.

Although the desiccant device repeats alternating cycles of dehumidifying process air and regeneration of the desiccant material by desorbing moisture as in any conventional system, the present system is unique in that the regeneration process is divided into two stages such that the first regeneration stage is performed with a low temperature regeneration air while the second regeneration stage is performed with high temperature regeneration air which is generated by heating a portion of the regeneration air with a superheated refrigerant vapor.

In the present system, the desiccant device maybe formed as a rotator, so that a rotation of the desiccant device enables the desiccant material to return to the first passage region by passing through the first passage region, the second passage region, and the third passage region, thereby improving the desorbing capacity of the desiccant device by performing regeneration process in stages.

The refrigerant temperature can also be raised by heating the inflow refrigerant into the compressor of the heat pump with superheated vapor of compressed refrigerant.

By compressing the refrigerant after increasing the degree of superheating of the inflow refrigerant of the compressor, the degree of superheating at the compressor outlet is increased, and by utilizing the heat of condensation to increase the degree of superheat of the refrigerant for changing the proportion of the latent heat (from condensation) to the sensible heat (from superheating) in the transferred heat from high pressure refrigerant to regeneration air so as to increase the ratio of the sensible heat contributing to raise the regeneration air. This approach enables to attain as high a temperature of regeneration air in a given thermal system, thereby enabling to optimize the desiccant dehumidification performance.

The system may be arranged so that the refrigerant flowing in a refrigerant passage, communicating the first high temperature heat exchanger with the second high temperature heat exchanger, is used to transfer heat to the inflow refrigerant of the compressor. After releasing the sensible heat contribution to heat the regeneration air with the superheated vapor of the compressor outflow refrigerant in the first high temperature heat exchanger of the heat pump, the refrigerant is superheated in a refrigerant heat exchanger with the heat of condensation of saturated vapor so as to increase the degree of superheating of the inflow refrigerant to the compressor, and then the superheated refrigerant is compressed. This approach permits not only to increase the degree of superheating of the refrigerant, but by using a part of condensation heat to increase the degree of superheating of the refrigerant, additional thermal benefit can be obtained. In the present system, a portion of the heat of condensation is utilized to superheat the refrigerant vapor, therefore, the proportion of the latent heat (from condensation) to the sensible heat (from superheating) contributing to the desorbing process of the regeneration air can be manipulated. This approach enables to attain as high a temperature of regeneration air in a given thermal system, thereby enabling to optimize the desiccant performance.

A refrigerant heat exchanger may be provided in a low pressure refrigerant passage communicating a low temperature heat exchanger of the heat pump device with the compressor such that the refrigerant flowing into the compressor is heated through heat exchange with the refrigerant flowing in other passage of the refrigerant heat exchanger which is led from a high pressure passage which communicates the first high temperature heat exchanger with the second high temperature heat exchanger. After releasing the sensible heat contribution to heat the regeneration air with the superheated vapor of the compressor outflow refrigerant in the first high temperature heat exchanger of the heat pump, the refrigerant is superheated in a refrigerant heat exchanger with the heat of condensation of saturated vapor so as to increase the degree of superheating of the inflow refrigerant exiting the low temperature heat exchanger (which is in a dry, saturated state) to flow into the compressor, and then the superheated refrigerant is compressed. This approach permits not only to increase the degree of superheating of the refrigerant, but by using a part of condensation heat to increase the degree of superheating of the refrigerant, additional thermal benefit can be obtained. In the present system, a portion of the heat of condensation is utilized to superheat the refrigerant vapor, therefore, the proportion of the latent heat (from condensation) to the sensible heat (from superheating) contributing to the desorbing process of the regeneration air can be manipulated. This approach enables to attain as high a temperature of regeneration air in a given thermal system, thereby enabling to optimize the desiccant performance.

The system may be provided with a vapor/liquid separator in a high pressure passage which communicates the first high temperature heat exchanger with the second high temperature heat exchanger, such that a vapor phase of the refrigerant is separated in the vapor/liquid separator and is led to the refrigerant heat exchanger to condense. By using the vapor/liquid separator to utilize only the vapor phase, which is in a dry saturated state, of the inflow refrigerant to the compressor of the heat pump to increase the degree of superheating of the inflow refrigerant, it is possible to reduce the amount of refrigerant flowing through the refrigerant heat exchanger, so that the size of the piping and the heat exchanger can be made small.

The system may be arranged so that a high pressure vapor passage from the vapor/liquid separator is communicated with the refrigerant heat exchanger, and a constrictor device is provided in a liquid passage from the vapor/liquid separator such that the passage beyond the constrictor device is merged with the high pressure refrigerant vapor passage beyond the refrigerant heat exchanger and a merged passage is communicated with the second high temperature heat exchanger of the heat pump device. By providing a constrictor in the liquid passage from the vapor/liquid separator, a fore- and aft-pressure differential in the high pressure refrigerant passage in the refrigerant heat exchanger can be assured, thereby enabling to supply a dry, saturated vapor into the refrigerant heat exchanger even if the refrigerant heat exchanger is remote from the first or second high temperature heat exchanger.

The object also can be achieved in an air conditioning system comprising: a process air passage for flowing process air; a regeneration air passage for flowing regeneration air; a desiccant device which can be selectively communicated with either the process air passage or the regeneration air passage; and a heat pump device for supplying a heating heat for regenerating the desiccant device to the regeneration air, the heat pump device having a compressor and workable on process air as a low temperature heat source and regeneration air as a high temperature heat source, wherein the refrigerant flowing into the compressor of the heat pump device is heated with a saturated vapor of compressed refrigerant to raise a temperature of compressed refrigerant so as to enhance the heating ability for heating the regeneration air.

The pre-compressor refrigerant is heated with the post-compressor saturated refrigerant vapor, thereby increasing the temperature or enthalpy of the post-compressor superheated refrigerant vapor thereby raising the sensible heat contribution of the high temperature source of the heat pump. Thus, the temperature of the regeneration air is heated through heat exchange with the refrigerant so that regeneration temperature is raised and the dehumidification capacity of the desiccant material is improved.

The system may be constructed such that the desiccant device is communicable with at least a first passage region for performing dehumidification of process air, a second passage region for performing regeneration step of the desiccant device, and the desiccant device is designed so that a desiccant material sequentially passes the first and second passage region regions; that the high temperature heat source of the heat pump device is comprised by at least two heat exchangers so that the outflowing refrigerant from the compressor flows successively from a first high temperature heat exchanger into a second high temperature heat exchanger; that regeneration air flows successively from the second high temperature heat exchanger to the first high temperature heat exchanger, and then flows through the second passage region; and that and a refrigerant heat exchanger is provided in a low pressure refrigerant passage communicating a low temperature heat exchanger of the heat pump device with the compressor such that the refrigerant flowing into the compressor is heated through heat exchange with the refrigerant flowing in other passage of the refrigerant heat exchanger which is led from a high pressure passage which communicates the first high temperature heat exchanger with the second high temperature heat exchanger.

Accordingly, by arranging counter-current flows of regeneration air and refrigerant flow, regeneration air for desiccant regeneration is made to first undergo heat exchange step with the second high temperature heat exchanger of the heat pump operating at the condensation temperature of the refrigerant, and then to undergo another heat exchange step with the first high temperature heat exchanger of the heat pump operating at a higher temperature. The result is that the desiccant regeneration temperature is increased and the dehumidifying capacity of the desiccant device is improved.

The desiccant device may be formed as a rotator, so that rotation of the desiccant device enables the desiccant material to return to the first passage region by passing through the first passage region, the second passage region and the third passage region. Accordingly, the two processes for the desiccant device, dehumidification process and desiccant regeneration process can be carried out continuously.

The system may be arranged so that a vapor/liquid separation device is provided in a high pressure refrigerant passage, communicating the first high temperature heat exchanger to the second high temperature heat exchanger, so that a vapor phase of the refrigerant is separated and led into the refrigerant heat exchanger to condense so as to provide heat to the refrigerant flowing into the compressor. By using the vapor/liquid separator to separate only the refrigerant vapor which is in a dry, saturated state to obtain a high degree of superheating of the inflow refrigerant to the compressor of the heat pump, the amount of the high pressure refrigerant flowing in the refrigerant heat exchanger can be reduced, thereby enabling to reduce the size of piping and heat exchanger in the refrigerant circuit.

The system may be arranged so that a high pressure vapor passage from the vapor/liquid separator is communicated with the refrigerant heat exchanger, and a constrictor device is provided in a liquid passage from the vapor/liquid separator such that the passage beyond the constrictor device is merged with the high pressure refrigerant vapor passage beyond the refrigerant heat exchanger and a merged passage is communicated with the second high temperature heat exchanger of the heat pump device. By providing a constrictor in the liquid passage from the vapor/liquid separator, a fore- and aft-pressure differential in the high pressure refrigerant passage in the refrigerant heat exchanger can be assured, thereby enabling to supply a dry, saturated vapor into the refrigerant heat exchanger even if the refrigerant heat exchanger is remote from the first or second high temperature heat exchanger.

BRIEF DESCRIPTION OF DRAWINGS

FIG. 4 is a Mollier diagram showing the refrigerant cycle in a third embodiment;

FIGS. 5A and 5B are schematic drawings of the basic system and a perspective view of various parts of a desiccant wheel in a third embodiment;

FIG. 7 is a Mollier diagram showing the refrigerant cycle in the fourth embodiment;

FIG. 14 is a Mollier diagram of the refrigerant cycle of the conventional air conditioning system shown in FIG. 13.

BEST MODE FOR CARRYING OUT THE INVENTION

A first embodiment will be explained with reference to FIGS. 1A, 1B and 2.

Figure 1A:
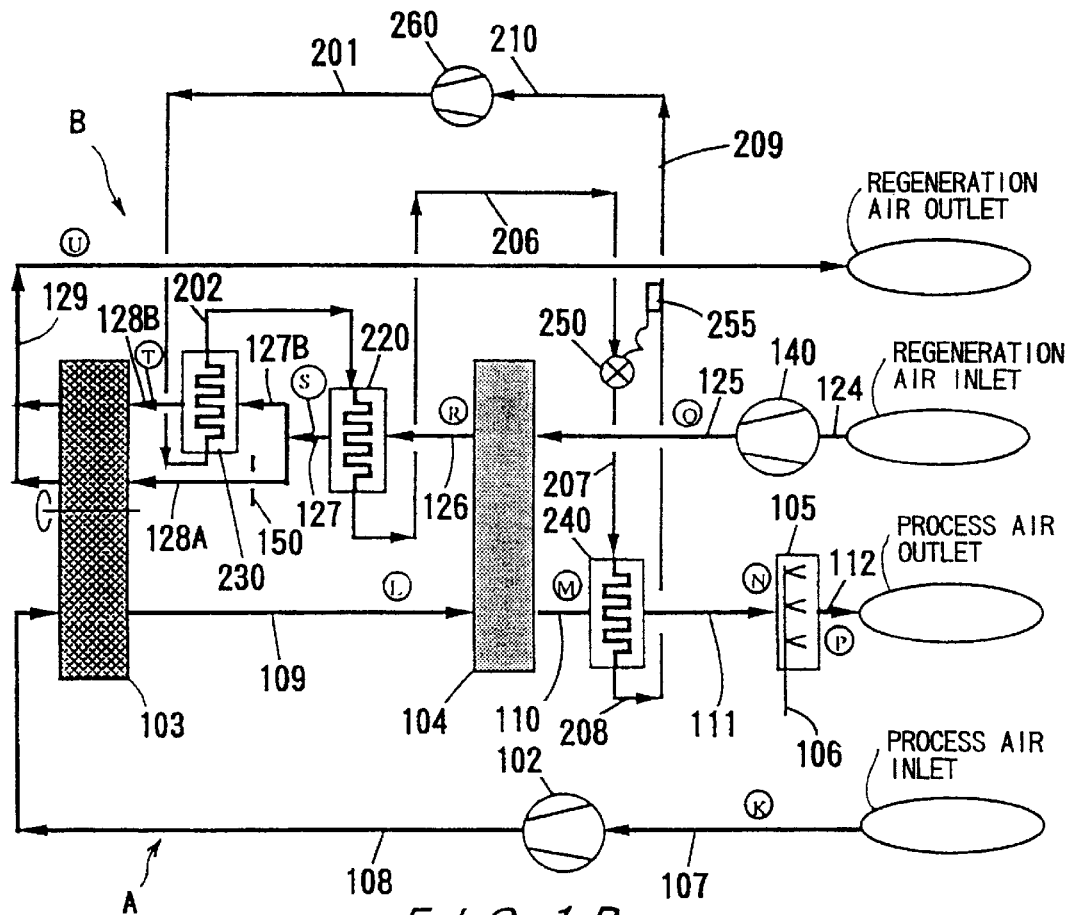
FIGS. 1A and 1B are schematic drawing of the basic system and a perspective view of various parts of a desiccant wheel in a first embodiment.
Figure 2:
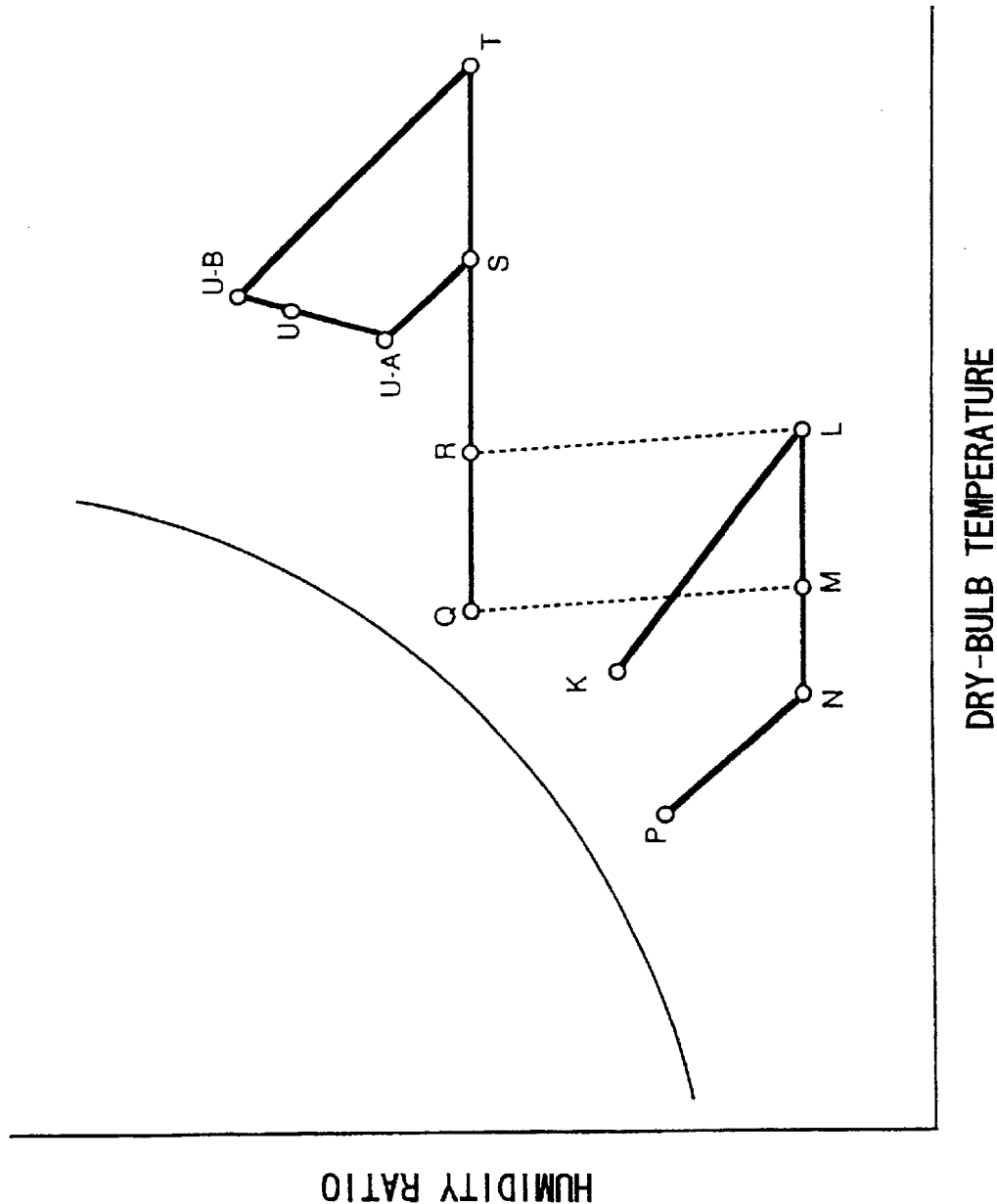
FIG. 2 is a psychrometric chart of the desiccant desorption cycle for the air conditioning system shown in FIG. 1.

FIG. 1A is a schematic representation of the first embodiment of the desiccant assisted air conditioning system. The vapor compression heat pump section of the system comprises a compressor 260, a low-temperature heat exchanger (evaporator) 240, a first high-temperature heat exchanger (sensible heat exchanger) 230, a second high-temperature heat exchanger (condenser) 220, and an expansion valve 250 to perform refrigeration cycles wherein a low-pressure wet refrigerant vapor is in heat exchange relationship with a post-desiccant process air in the evaporator 240, a pre-desiccant regeneration air is in heat exchange relationship with an over-heated refrigerant vapor in the sensible heat exchanger 230, and a high-pressure wet refrigerant vapor is in heat exchange relationship with a pre-desiccant and pre-sensible heat exchanger 230 regeneration air in the condenser 220.

Figure 12:
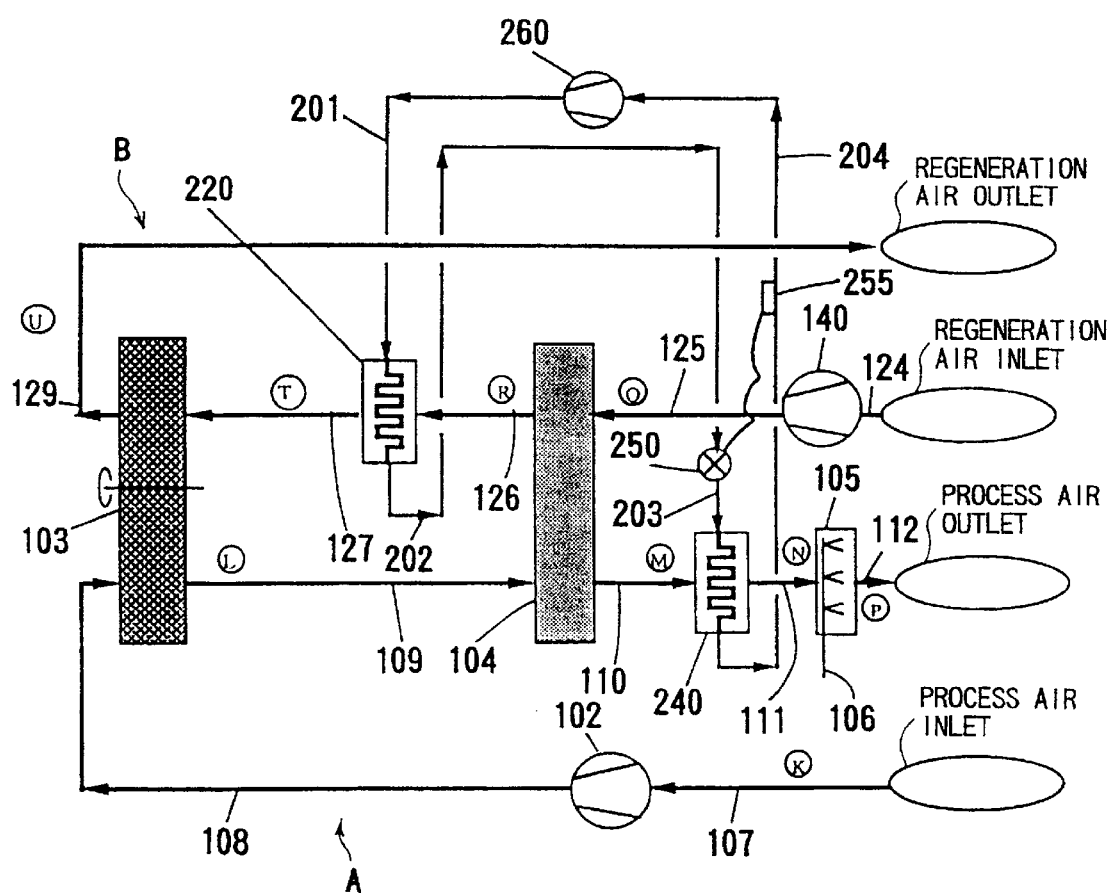
FIG. 12 is a schematic drawing of the basic system in a conventional air conditioning system.
Figure 13:
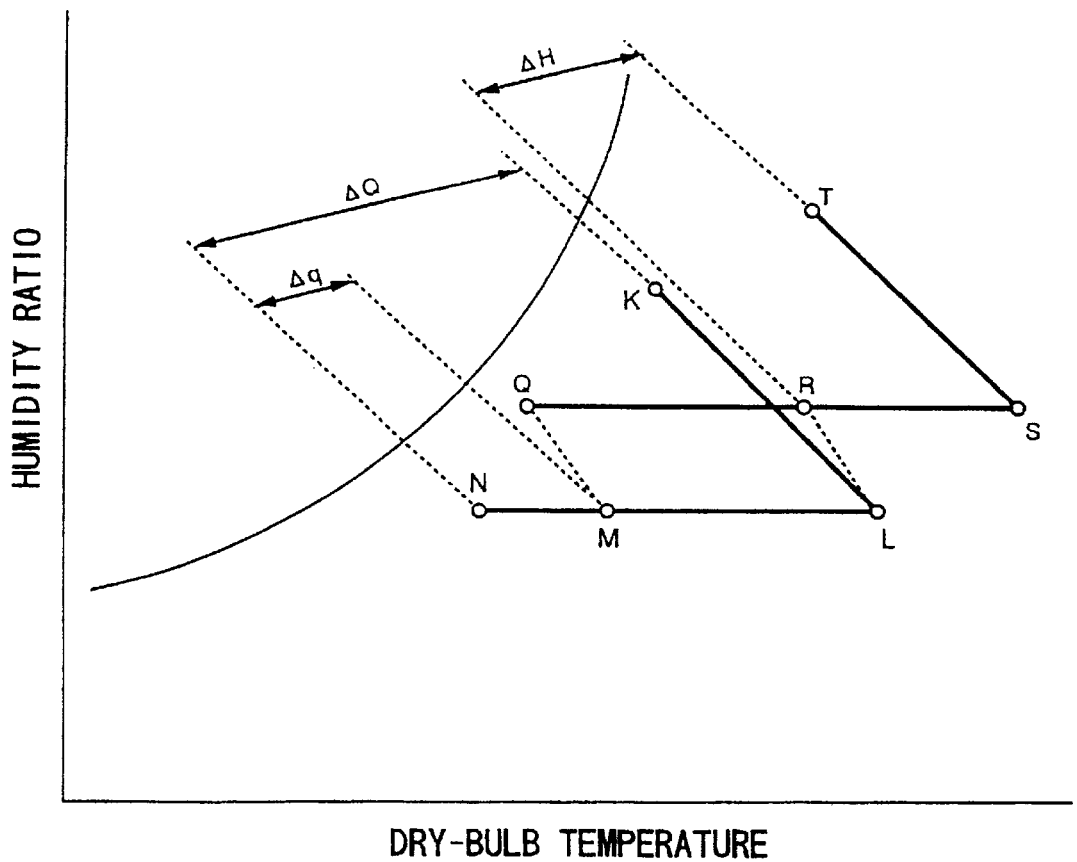
FIG. 13 is a psychrometric chart of a desiccant desorption cycle of a desiccant in a conventional air conditioning system.
Figure 15:
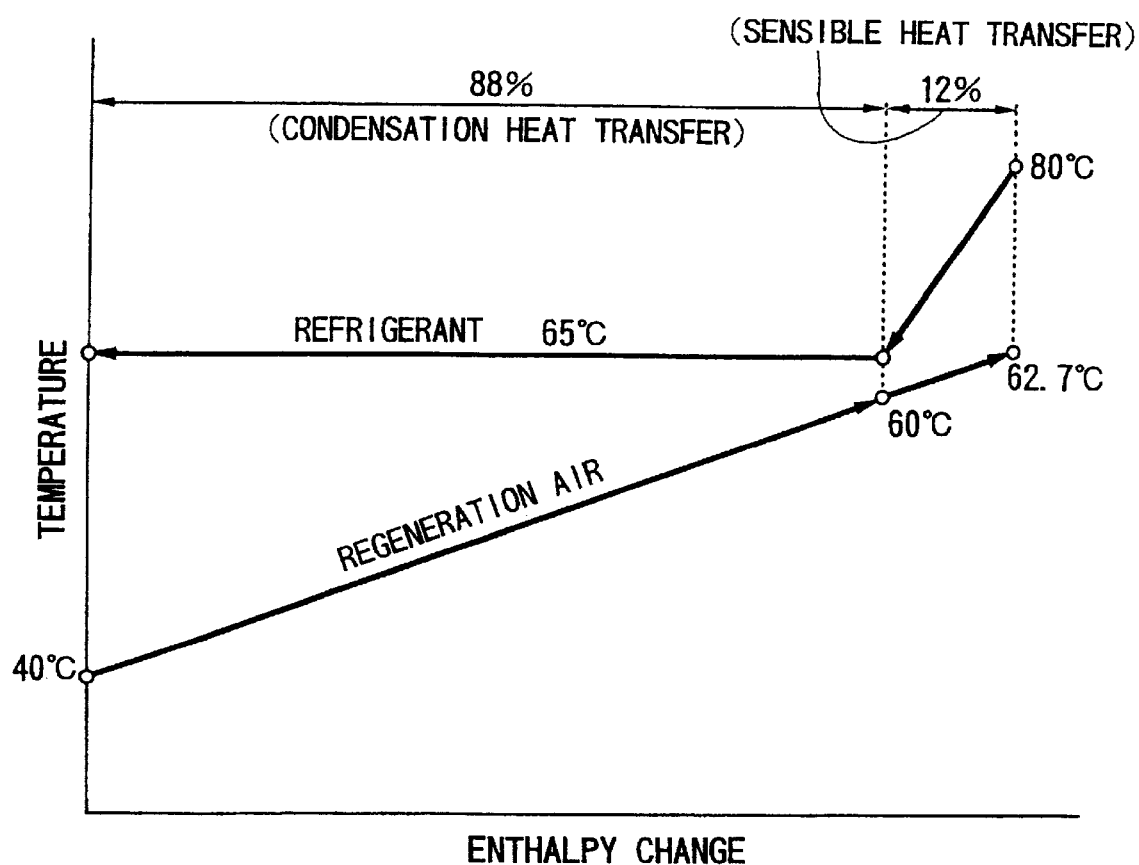
FIG. 15 is a graph showing a relation between the temperature and the enthalpy change in the refrigerant and the regeneration air in a conventional desiccant-assisted air conditioning system.

In the example shown, the desiccant wheel 103 is also rotatable to traverse both the process air passage A and the regeneration air passage B in a predetermined cycle in the same manner as described in FIG. 12. The process air passage A is constructed as-follows: a conditioning space 101 is communicated with the intake of the blower 102 through the passage 107; the outlet of the blower 102 is communicated with a first section of the desiccant wheel 103 for conducting a dehumidification process through the passage 108; the discharge for the process air from the desiccant wheel 103 is communicated with the sensible heat exchanger 104 -heat-exchangeable with the regeneration air through the passage 109; the outlet for the process air from the heat exchanger 104 is communicated with the evaporator (cooling device) 240 through the passage 110; the outlet for the process air from evaporator 240 is communicated with the humidifier 105 through the passage 111; and the outlet for the process air from the humidifier 105 is communicated with an inlet port for supplying processed air through the passage 112; thereby completing a processing cycle for the process air.

In the meantime, the regeneration air passage B is as follows: outside environment is connected to the intake of the blower 140 through the passage 124 for taking in the outside air as a regeneration air; the outlet of the blower 140 is communicated with the sensible heat exchanger 104 for exchanging heat with the process air; the outlet for the regeneration air from the sensible heat exchanger 104 is communicated with the condenser 220 through the passage 126; the outlet for the regeneration air from the sensible heat exchanger 104 is branched off into two, one of them is communicated with a second section of the desiccant wheel 103 for conducting a first regeneration process via a restriction device 150 such as a punching metal through the passage 128A, and the other is communicated with the sensible heat exchanger 230 through the passage 127B; the outlet for the regeneration air from the sensible heat exchanger 230 is communicated with a third section of the desiccant wheel 103 for conducting a second regeneration process through the passage 128B; the outlets for the regeneration air from the second and third sections of the desiccant wheel 103 merge to be communicated with an outside environment through the passage 129; thereby completing an regeneration air cycle for the regeneration air. In FIG. 1A, the circled alphabetical designations K~U refer to the thermodynamic states of the air corresponding to those in FIG. 2.

Figure 1B:
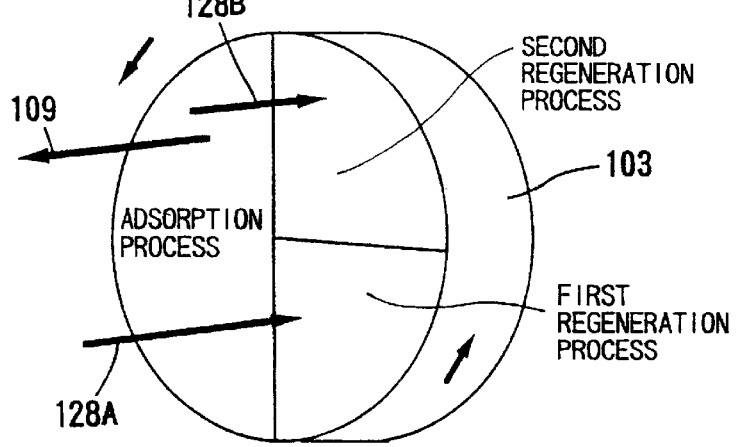

As illustrated in FIG. 1B, the desiccant device, which rotates while straddling both the process air passage A and the regeneration air passage B, and a first passage region is connected to the process air passage A through passages 108, 109 for adsorbing moisture; a second passage region is connected to the regeneration air passage B through passages 128A, 129 for performing a first regeneration process; a third passage region is connected to the regeneration air passage B through passages 128B, 129 for performing a second regeneration process. It is constructed so that each portion of the desiccant wheel passes through the first, second and third passage regions and returns to the first passage region.

The vapor compression refrigeration cycle in the desiccant-assisted air conditioning system will be explained below. The refrigerant vaporizes in the evaporator 240, by receiving the latent heat of vaporization from the process air which had been desorbed of its moisture in the desiccant 103; enters through a passage 209 into the compressor 260 to be compressed; flows through a passage 201 into the first high temperature heat exchanger (sensible heat exchanger) 230 to release the sensible heat of superheated refrigerant vapor to pre-desiccant regeneration air; flows through a passage 202 into the second high temperature heat exchanger (condenser) 220 to release the condensation heat to regeneration air before it enters into the desiccant wheel 103 and the high temperature heat exchanger (sensible heat exchanger) 230, thereby condensing into a liquid. The condensed refrigerant is forwarded to the expansion valve 250 through a passage 206 to undergo expansion and pressure reduction, and refluxes to the evaporator (cooling device) 240.

The operation of the desiccant-assisted air conditioning system will be explained with reference to the psychrometric chart presented in FIG. 2. Return air admitted into the system (process air: state K) is drawn into the blower 102 through a passage 107 to raise its pressure and is sent through a passage 108 to the first passage region for dehumidification by the desiccant wheel 103, wherein the desiccant material adsorbs moisture in the process air lowering its absolute humidity and, concurrently, increasing the air temperature by the heat of adsorption (state L). Process air with a lower humidity and a higher temperature is sent through a passage 109 to the sensible heat exchanger 104 to be cooled (state M) by heat exchange with the outside air (regeneration air). Cooled process air is led through a passage 110 to be cooled (state N) in the evaporator (cooling device) 240. Cooled process air is sent to the humidifier 105 to have its temperature lowered (state P) in the humidifier 105 by water spraying or evaporative humidification in an isenthalpic process, and is returned to the conditioning space as supply air through a passage 112.

In the meantime, regeneration of the desiccant wheel 103 is performed in the following manner. The outside air to be used as regeneration air (state Q) is drawn into the blower 104 through a passage 124 to raise the pressure, and is sent to the sensible heat exchanger 104 wherein it cools the process air while raising its own temperature (state R), and is then sent to the condenser 220 through the passage 126, is heated by the wet refrigerant vapor to raise the temperature (state S). Regeneration air exiting from the condenser 220 is split into two paths. Regeneration air in one path is led to the desiccant wheel 103 in the second passage region, for performing the first regeneration process (state U_A) for the desiccant material. Regeneration air in the other path is led to the sensible heat exchanger 230 wherein the regeneration air temperature is further raised (state T) by the superheated refrigerant vapor and then it passes through the desiccant wheel 103 in the third passage region for performing the second regeneration process (state U_A) of desorbing the moisture. Regeneration air which has passed through the third passage region after the second regeneration process merges with regeneration air which has passed through the second passage region after the first regeneration process (state U) and is discharged to outside through a passage 129 as an exhaust gas.

The desiccant-assisted air conditioning system is operated by simply repeating the processes of desiccant regeneration by the regeneration air and dehumidifying and cooling the process air for air conditioning of indoor spaces. Since a portion of the regeneration air, after passing over the condenser 220, is divided into two paths, such that in one of the paths, after reducing the flow rate to reduce the heat capacity, regeneration air is heated by the superheated vapor compressed in the compressor, it is possible to raise the regeneration air temperature to above the condensation temperature even with only 12% of the total heat available from the sensible heat of the superheated vapor. Thus, the second regeneration process for the desiccant wheel 103 in the third passage region is carried out by using regeneration air having such a high temperature. It is obvious that the desiccant regeneration process is much improved compared with the conventional approach. This will be explained in the following using an actual example.

Suppose a case such that the cooling cycle is represented by FIG. 14, the temperature at the inlet of the conventional condenser is 40° C., temperature rise is 20° C., and the refrigerant condensing temperature is 65° C., then according to the present embodiment, since the heat supplied by the condenser in the heat pump is 88%, the temperature Ts of the air at state S is given by:

$$Ts=40+20\times 88/100=57.6° C.$$

and after dividing the regeneration air, about 15% of the divided air is heated with 12% of the heat available from the superheated vapor, then the temperature Tt of the regeneration air at state T is given by:

$$Tt=57.6+20\times 12/100/0.15=73.6° C.$$

The thermal efficiency of the heat exchanger is given by:

$$\Phi=(73.6-57.6)/(80-57.6)\times 100\%=71.4\%$$

which is an easily attainable value by using a counterflow type heat exchanger for the sensible heat exchanger 230, thus enabling to obtain a temperature rise for regeneration air, which is 8.3° C. higher than the condensation temperature of 65° C.

Accordingly, the present embodiment enables to regenerate the desiccant wheel 103 in the third passage region, which is for performing the second regeneration process, at a temperature higher than the condensation temperature.

Therefore, the desorbing capacity of the desiccant material immediately prior to starting the regeneration process can be increased more than in the conventional approach, thereby presenting an air conditioning system that is energy conserving and yet provides a superior desorption capacity.

It should be noted that exhaust air from room conditioning process has widely been used for desiccant desorption, and in the present embodiment, such a process may be applied to achieve the same effect.

Figure 3A:
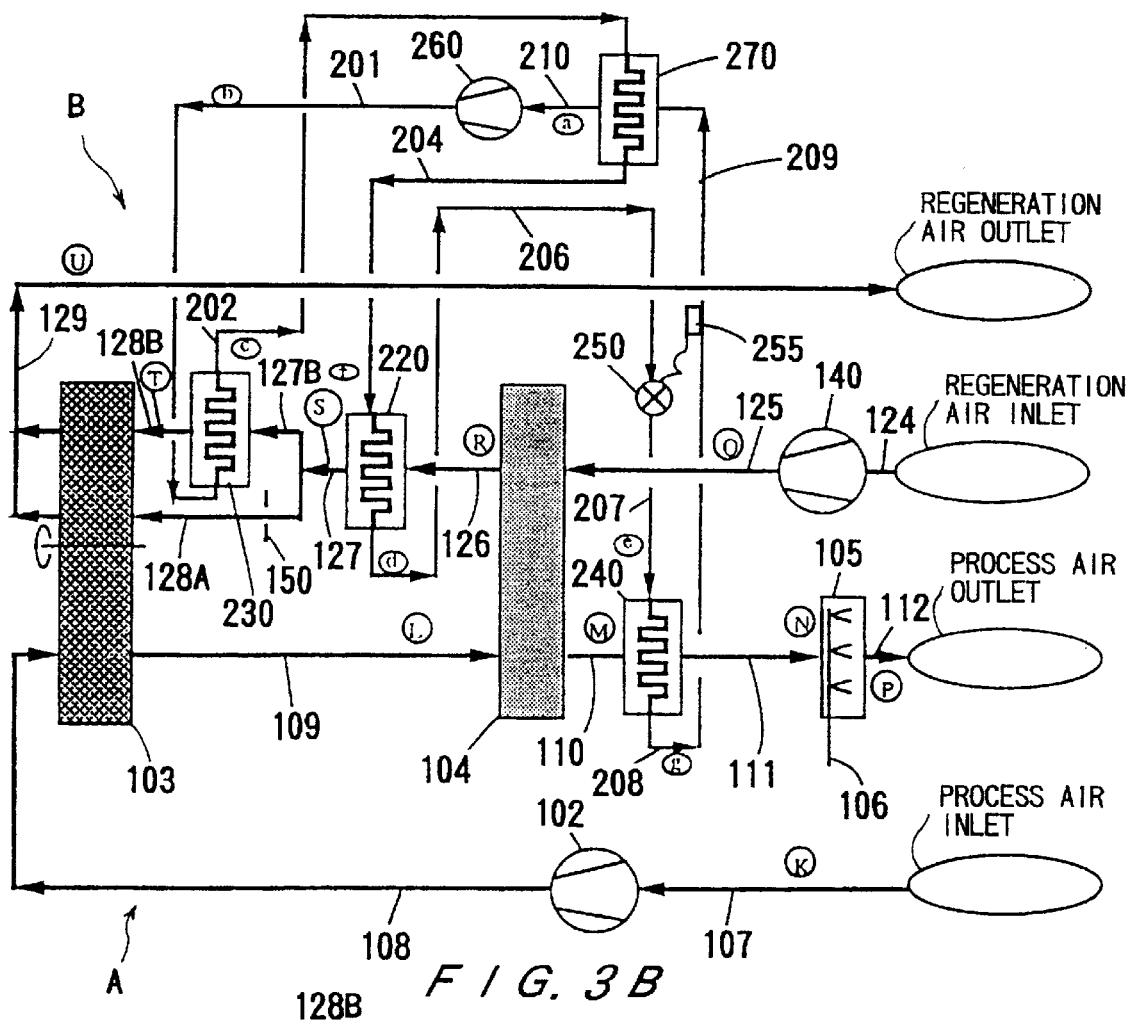
FIGS. 3A and 3B are schematic drawings of the basic system and a perspective view of various parts of a desiccant wheel in a second embodiment.
Figure 3B:
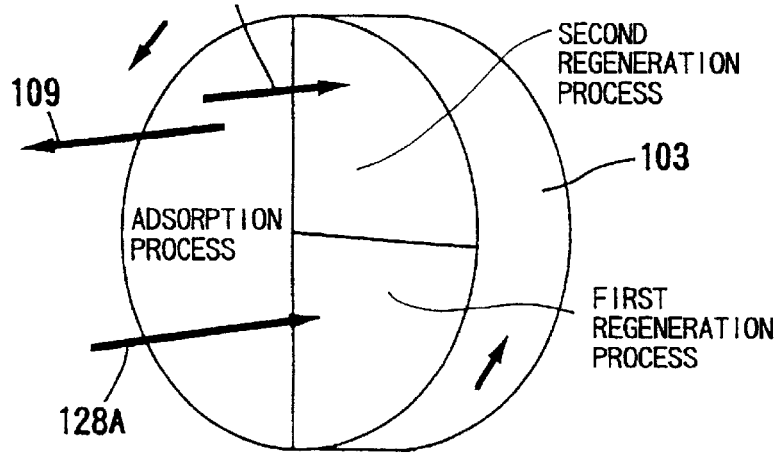

FIG. 3 shows a second embodiment. In this system, the vapor compression heat pump section is comprised by: a compressor 260; a low temperature heat exchanger (evaporator) 240; a first high temperature heat exchanger (sensible heat exchange) 230; a second high temperature heat exchanger (condenser) 220; an expansion valve 250; to constitute a refrigeration cycle: and in addition, the refrigeration cycle further includes a refrigerant heat exchanger 270, in the passage between the low temperature heat exchanger (evaporator) 240 and the compressor 260, so that the high pressure wet refrigerant vapor exiting the sensible heat exchanger 230 flows into the condenser 220 after performing heat exchange in the refrigerant heat exchanger 270 with the pre-compressor low pressure refrigerant. In this system, other heat exchange processes are the same as those in the first embodiment: i.e., in the evaporator 240, low pressure wet refrigerant vapor exchanges heat with post-desiccant 103 process air; in the sensible heat exchanger 230, pre-desiccant regeneration air exchanges heat with superheated refrigerant vapor; and in the condenser 220, high pressure wet refrigerant vapor exchanges heat with pre-desiccant regeneration air yet to enter the sensible heat exchanger 230.

The mechanism in the process air conditioning side of the system is the same as that in the first embodiment, therefore, the following explanations relate only to the desiccant regeneration process in the refrigeration cycle of the system. The refrigerant vaporizes in the evaporator 240, by receiving the latent heat of vaporization from the process air which had been processed in the desiccant wheel 103, and enters through a passage 209 into the refrigerant heat exchanger 270; and after exchanging heat with the high pressure saturated vapor in the refrigerant heat exchanger 270, enters into the compressor 260 to be compressed. The compressed refrigerant flows into the sensible heat exchanger 230 through a passage 201, and after releasing the sensible heat of superheated refrigerant vapor to pre-desiccant regeneration air, and reaches the refrigerant heat exchanger 270, wherein it exchanges heat with dry saturated low pressure refrigerant before it enters into the compressor, to condense a portion thereof. High pressure refrigerant exiting the refrigerant heat exchanger 270 flows into the condenser 220, and releases the heat of condensation to pre-desiccant regeneration air which has not yet entered the first high temperature heat exchanger (sensible heat exchanger) 230, and condenses. The condensed refrigerant arrives at the expansion valve 250 through a passage 206 to undergo expansion and pressure reduction, and refluxes back to the evaporator (cooling device) 240.

This refrigeration cycle will be explained using the Mollier diagram shown in FIG. 4. The refrigerant vaporizes (state g) in the evaporator (cooling device) 240; arrives in the refrigerant heat exchanger 270 through a passage 209 to exchange heat (state a) with the high pressure saturated vapor exiting the sensible heat exchanger 230; and is drawn into the compressor 260 to be compressed therein. The compressed refrigerant (state b) flows into the sensible heat exchanger 230 and releases (state c) sensible heat of the superheated vapor to pre-desiccant regeneration air; arrives at the refrigerant heat exchanger 270 to exchange heat with a low pressure, dry saturated refrigerant which has not yet entered into the compressor and a portion of the refrigerant condenses (state f). In this case, because the low pressure refrigerant (states g~a) is not subjected to a temperature higher than the condensation temperature, the heat transfer is limited, and the high pressure saturated vapor in the refrigerant heat exchanger 270 drops its dryness to a state f and its enthalpy is lowered, and meanwhile, the low pressure refrigerant becomes a superheated vapor (state a) and its enthalpy is increased. The high pressure refrigerant (state f) exiting the refrigerant heat exchanger 270 flows into the condenser 220, and condenses (state d) by releasing the heat of condensation to pre-desiccant regeneration air which has not yet entered into the sensible heat exchanger 230. The condensed refrigerant enters into the expansion valve 250 and after expanding and reducing the pressure (state e), it refluxes back to the evaporator (cooling device) 240. In this embodiment, because the enthalpy of the refrigerant (state f) at the inlet to the condenser 220 is lowered while the enthalpy is increased at the outlet of the compressor and the inlet of the sensible heat exchanger 230, the proportion of heat transferred in the sensible heat exchanger 230 is increased compared with the first embodiment so that the amount of heat transferred is 35% in the sensible heat exchanger 230 and 65% in the condenser 220.

The operation of the air conditioning system in the air circulation side of this embodiment is the same as that in the first embodiment, so the explanations are omitted. Nevertheless, it should be mentioned that the air flow rate through the sensible heat exchanger 230 can be increased compared with the first embodiment. In the refrigeration cycle shown in FIG. 4, the condensation temperature is set at 60° C. by taking this effect into account. This will be further explained below using an actual example.

According to this embodiment, because the amount of heat transfer in the condenser 220 is 65%, the temperature Ts at state S is given by:

$$Ts=40+20\times 65/100=53° C.$$

Regeneration air is then split, and if it is assumed that the superheated vapor uses about 35% of the heat to heat about 30% of regeneration air, then the temperature Tt at state T is given by:

$$Tt=53+20\times 30/100/0.3=73° C.$$

which is about the same as the temperature obtained in the first embodiment. The temperature efficiency ratio of the heat exchanger is given by:

$$\Phi=\{(73-53)/(105-53)\}\times 100=38.4\%$$

which is realistically achievable in any heat exchanger, and regeneration air which is heated to a temperature 13° C. higher than the condensation temperature of 60° C. can be obtained.

In this system, after heating the regeneration air with the refrigerant vapor, superheated at the outlet of the compressor, in the sensible heat exchanger so as to remove the sensible heat therefrom, and then, raising the degree of superheating of compressor inflow refrigerant exiting the evaporator 240 in a dry, saturated state with the latent heat of condensation of saturated vapor in the refrigerant heat exchanger 270. The temperature increase in regeneration air is further aided by utilizing a portion of condensation heat for increasing the superheating of the refrigerant without raising the compression ratio in the compressor (in this embodiment, the ratio is actually lessened). In essence, the system enables to vary the proportion of latent heat (from condensation) and sensible heat (by superheating) to be transferred from the high pressure refrigerant to regeneration air. The result is to enable regeneration of the desiccant at a temperature exceeding the condensation temperature in the third passage region to carry out the second regeneration process. Therefore, the desiccant is provided with a higher dehumidification capability just prior to the desorption process than in conventional systems to enable to present energy conserving air conditioning system having a superior dehumidification capability.

FIG. 5 shows a third embodiment. In this system, the vapor compression heat pump section is comprised by: a compressor 260; a low temperature heat exchanger (evaporator) 240; a first high temperature heat exchanger (sensible heat exchange) 230; a second high temperature heat exchanger (condenser) 220; an expansion valve 250; to constitute a refrigeration cycle: in addition, the refrigeration cycle further includes a refrigerant heat exchanger 270, in the passage between the low temperature heat exchanger (evaporator) 240 and the compressor 260, so that the high pressure wet refrigerant vapor exiting from the sensible heat exchanger 230 flows into the condenser 220 after performing heat exchange with the pre-compressor low pressure refrigerant. These aspects of this system is the same as those in the second embodiment; however, in this system, the high pressure refrigerant vapor exiting the sensible heat exchanger 230 is split into two passages in a vapor/liquid separator 280, so that the passage for the vapor phase is led to the refrigerant heat exchanger 270 through a passage 203, and that the passage for the liquid phase is provided with a constrictor 285 to lead to a passage 205, which is merged with a passage 204 for the high pressure refrigerant exiting the refrigerant heat exchanger 270, the merged path is led to the condenser 220. Other heat exchange processes are the same as those in the first and second embodiment: i.e., in the evaporator 240, low pressure wet refrigerant vapor exchanges heat with post-desiccant 103 process air; in the sensible heat exchanger 230, pre-desiccant regeneration air exchanges heat with superheated refrigerant vapor; and in the condenser 220, high pressure wet refrigerant vapor exchanges heat with pre-desiccant regeneration air yet to enter sensible heat exchanger 230.

The mechanism in the air circulation side of the system is the same as that in the first and second embodiments, therefore, only the differences in the refrigeration cycle will be explained in the following.

In the third embodiment, the high pressure refrigerant vapor (which is almost in a dry, saturated state) exiting the sensible heat exchanger 230 is split into two paths in the vapor/liquid separator 280. The vapor is led through the vapor path to the refrigerant heat exchanger 270 to perform heat exchange with the dry, saturated low pressure refrigerant, which has not yet entered into the compressor, and is condensed therein. The amount of refrigerant condensed in the refrigerant heat exchanger 270 is small, because the low pressure refrigerant to be heated has a low specific heat and the heat exchange process is sensible such that the temperature does not rise beyond the condensation temperature providing only a limited amount of heat transfer. Therefore, not all the vapor is condensed, and the liquid amount represents less than 20% of the refrigerant outflow rate from the compressor. Therefore, a small amount of high pressure refrigerant is needed to be supplied to the refrigerant heat exchanger 270 so that piping diameter in this path can be small.

For the liquid path from the vapor/liquid separator 280, about 80% of the outflow rate from the compressor can be bypassed directly into the condenser 220. For the desiccant-assisted air conditioning system arrangement, it is desirable that the sensible heat exchanger 230 and the condenser 220 be located nearby. Therefore, the arrangement of directly supplying about 80% of the compressor refrigerant outflow to the condenser 220 by bypassing the refrigerant heat exchanger 270 is effective in reducing the cost of piping. If there is no resistance is provided in the passage 205, almost all of the refrigerant will bypass the refrigerant heat exchanger 270, therefore, it is necessary to adjust the bypass flow rate ratio by providing the constrictor 285. However, the bypass rate adjustment need not be strict, and even if a large flow rate of refrigerant is directed to the refrigerant heat exchanger 270, system performance would not be affected because the heat transfer is limited as explained above.

Accordingly, by separating a dry and saturated refrigerant vapor in the vapor/liquid separator for use in increasing the degree of superheating of the refrigerant at the compressor inlet, the amount of high pressure refrigerant flowing through the refrigerant heat exchanger can be lowered, so that that the size of the piping and the refrigerant heat exchanger in the refrigerant circuit can be reduced. Further, by providing a constrictor in the liquid path of the vapor/liquid separator, it becomes possible to secure a differential pressure between the inlet and outlet passage for the vapor phase of the high pressure refrigerant in the refrigerant heat exchanger, therefore, even if the refrigerant heat exchanger is remote from the sensible heat exchanger 230 and the condenser 220, a dry, saturated high pressure refrigerant vapor can be steadily delivered to the refrigerant heat exchanger 270.

Figure 6:
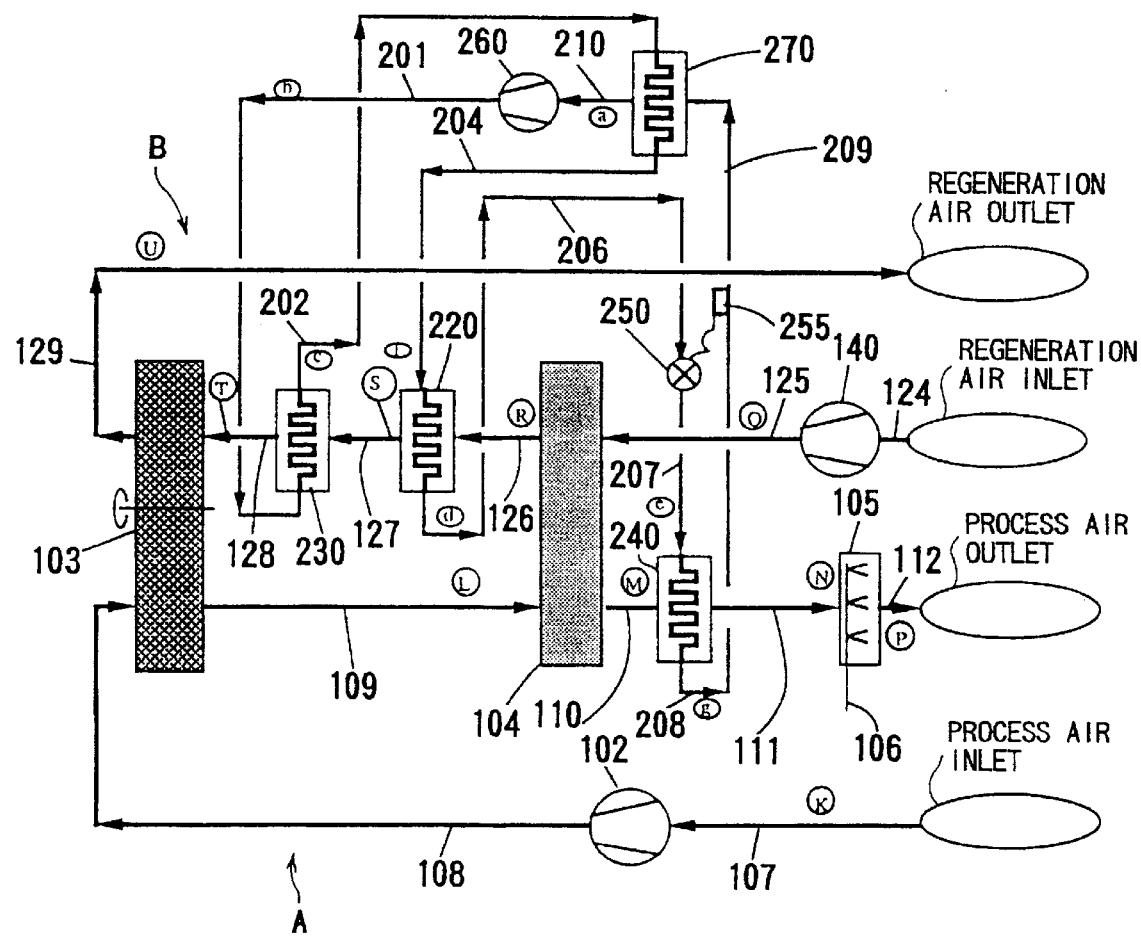
FIG. 6 is a schematic drawing of the basic system in a fourth embodiment.

FIG. 6 shows a fourth, embodiment of the basic structure of the desiccant-assisted air conditioning system, in which the vapor compression heat pump section is comprised by: a compressor 260; a low temperature heat exchanger (evaporator) 240; a first high temperature heat exchanger (sensible heat exchanger) 230; a second sensible heat exchanger (condenser) 220; and an expansion valve 250; to constitute the refrigeration cycle: and in addition, a refrigerant heat exchanger 270 is provided in the passage from the low temperature heat exchanger (evaporator) 240 to the compressor 260, so that after a heat exchange process between the low pressure refrigerant yet to enter into the compressor 260 with a high pressure wet refrigerant vapor exiting from sensible heat exchanger 230, the high pressure wet refrigerant vapor flows into the condenser 220. In the evaporator 240, a wet refrigerant vapor of the low pressure refrigerant exchanges heat with the post-desiccant regeneration air; in the sensible heat exchanger 230, the pre-desiccant regeneration air exchanges heat with superheated vapor of the refrigerant; and in the condenser 220, a wet refrigerant vapor of the high pressure refrigerant exchanges heat with the regeneration air before it enters into the sensible heat exchanger 230.

As explained in the case shown in FIG. 12, the desiccant wheel 103 is constructed such that the desiccant material rotates at a certain speed while straddling both the process air passage A and the regeneration air passage B. The process air passage A is comprised by connecting: the conditioning space to the inlet of the blower 102 for return air through a passage 107; outlet of the blower 102 to the desiccant wheel 103 in the first passage region through a passage 108; the outlet for the process air from the desiccant wheel 103 to the sensible heat exchanger 104 for exchanging heat with regeneration air through a passage 109; the outlet for process air from the sensible heat exchanger 104 to the evaporator (cooling device) 240 through a passage 110; the outlet for process air from the evaporator 240 to the humidifier 105 through a passage 111; and the outlet for process air from the humidifier 105 to the process air outlet serving as a supply inlet through a passage 112.

On the other hand, the regeneration air passage B is comprised by connecting: the outdoor air inlet to a blower 140 for regeneration air through a passage 124; the outlet from the blower 140 to the sensible heat exchanger 104 for exchanging heat with process air; the outlet for the regeneration air from the sensible heat exchanger 104 to the condenser 220 through a passage 126; the outlet for the regeneration air from the condenser 220 to the sensible heat exchanger 230 through a passage 127; the outlet for the regeneration air from the sensible heat exchanger 230 to the desiccant wheel 103 in the second passage region for regenerating the desiccant material through a passage 128; the outlet for the regeneration air from the desiccant wheel 103 in the second passage region to outside space through a passage 129, thereby completing the circulation path for admitting outdoor air into indoors and discharging spent air to outdoors. In the drawing, circled alphabets K~U refer to the various states of the air in FIG. 8.

The refrigeration cycle of the desiccant-assisted air conditioning system described above will be explained in the following. The refrigerant vaporizes in the evaporator (cooling device) 240, by receiving the latent heat of vaporization from the process air whose moisture had been desorbed in the desiccant wheel 103; enters through a passage 209 into the refrigerant heat exchanger 270, and exchanges heat with the high pressure saturated vapor therein; then enters into the compressor 260 to be compressed. Compressed refrigerant flows into the sensible heat exchanger 230 through a passage 201, and after releasing sensible heat of superheated refrigerant vapor to pre-desiccant regeneration air, reaches refrigerant heat exchanger 270 through a passage 202, and exchanges heat with dry saturated low pressure refrigerant so that a portion of the refrigerant is condensed. High pressure refrigerant exiting the refrigerant heat exchanger 270 flows into the condenser 220, and releases the heat of condensation to regeneration air which has not entered into the sensible heat exchanger 230, and condenses. The condensed refrigerant arrives at the expansion valve 250 through a passage 206 to undergo expansion and pressure reduction, and refluxes back to the evaporator (cooling device) 240.

This refrigeration cycle will be explained using the Mollier diagram shown in FIG. 7. The refrigerant vaporizes (state g) in the evaporator (cooling device) 240; arrives in the refrigerant heat exchanger 270 through a passage 209 to exchange heat (state a) with the high pressure saturated vapor exiting the sensible heat exchanger 230; and is drawn into the compressor 260 to be compressed. The compressed refrigerant (state b) flows into the sensible heat exchanger 230 and releases sensible heat of the superheated vapor to pre-desiccant regeneration air (state c); arrives at the refrigerant heat exchanger 270 to exchange heat with low pressure, dry saturated refrigerant which is yet to enter into the compressor and a portion of the refrigerant condenses (state f). In this case, because the low pressure refrigerant (state g~a) is not subjected to a temperature higher than the condensation temperature, the heat transfer is limited, and the high pressure saturated vapor in the refrigerant heat exchanger 270 drops its dryness to a state f and its enthalpy is lowered, and meanwhile, the low pressure refrigerant becomes a superheated vapor (state a) and its enthalpy is increased. The high pressure refrigerant (state f) exiting the refrigerant heat exchanger 270 flows into the condenser 220, and condenses (state d) by releasing the heat of condensation to regeneration air which is yet to enter into the sensible heat exchanger 230. The condensed refrigerant enters into the expansion valve 250 and after expanding and reducing the pressure (state e), refluxes back to the evaporator (cooling device) 240. In this embodiment, because the enthalpy of the refrigerant (state f) at the inlet to the condenser 220 is lowered while the enthalpy is increased at the outlet of the compressor and the inlet of the sensible heat exchanger 230, the proportion of heat transferred in the sensible heat exchanger 230 is increased compared with FIG. 12 so that the amount of heat transferred is 35% of the total heating ability of the heat pump in the sensible heat exchanger 230 and 65% in the condenser 220.

Figure 8:
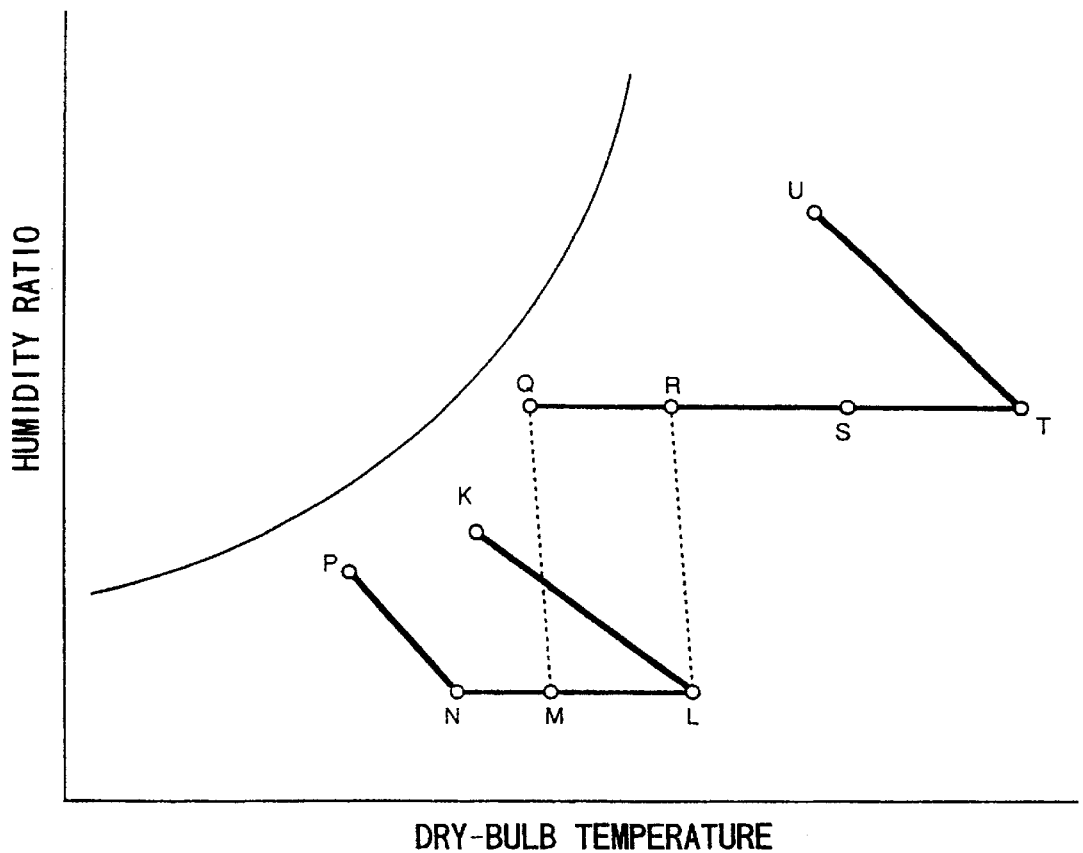
FIG. 8 is a psychrometric chart of the desiccant desorption cycle for the air conditioning system shown in FIG. 6.

The operation of the desiccant-assisted air conditioning system having a heat pump as a thermal source will be explained with reference to a psychrometric chart shown in FIG. 8. Return air admitted into the system (process air: state K) is drawn into the blower 102 through a passage 107 to raise the pressure and is sent through a passage 108 to the desiccant wheel 103 in the first passage region, wherein the desiccant material adsorbs moisture of the process air and its absolute humidity is lowered and concurrently the air temperature is raised by the effect of the heat of adsorption of the desiccant material (state L). Process air which now has lower humidity and higher temperature is sent through a passage 109 to the sensible heat exchanger 104 to be cooled (state M) by heat exchange with outside air (regeneration air). Cooled process air is sent to the evaporator (cooling device) 240 through a passage 110 (state N) to be cooled therein. Cooled process air is sent to the humidifier 105 to have its temperature lowered (state P) in the humidifier 105 by water spraying or evaporative humidification in an isenthalpic process, and is returned to the conditioning space as supply air through a passage 112.

In the meantime, regeneration of the desiccant wheel 103 is performed in the following manner. The outside air to be used as regeneration air (state Q) is drawn into the blower 1440 through a passage 124 to raise the pressure, and is sent to the sensible heat exchanger 104, wherein the regeneration air cools the process air while raising its own temperature (state R), and the regeneration air then sent to the condenser 220 through a passage 126, is heated by the wet refrigerant vapor to raise the temperature (state S). Regeneration air exiting the condenser 220 is led to the sensible heat exchanger 230 wherein the regeneration air temperature is further raised (state T) by the superheated refrigerant vapor and then it passes through the division of the desiccant wheel 103 for performing the regeneration process (state U) of desorbing the moisture, and is discharged to outside through a passage 129.

Although desiccant-assisted air conditioning system may be operated by simply repeating the processes of desiccant desorption and dehumidifying and cooling of process air, but in this embodiment, a new approach is taken so that the ratio of the heat added to the regeneration air in the sensible heat exchanger 230 to that in the condenser 220 is arranged to be 35%: 65%, so as to increase the heat added to the regeneration air in the sensible heat exchanger 230, as described above. Therefore, the temperature of the regeneration air can be increased beyond the condensation temperature by the action of the sensible heat from the superheated vapor. It is obvious that the desiccant desorption process is improved compared with the conventional approach. This will be explained in the following using an actual example.

Figure 9:
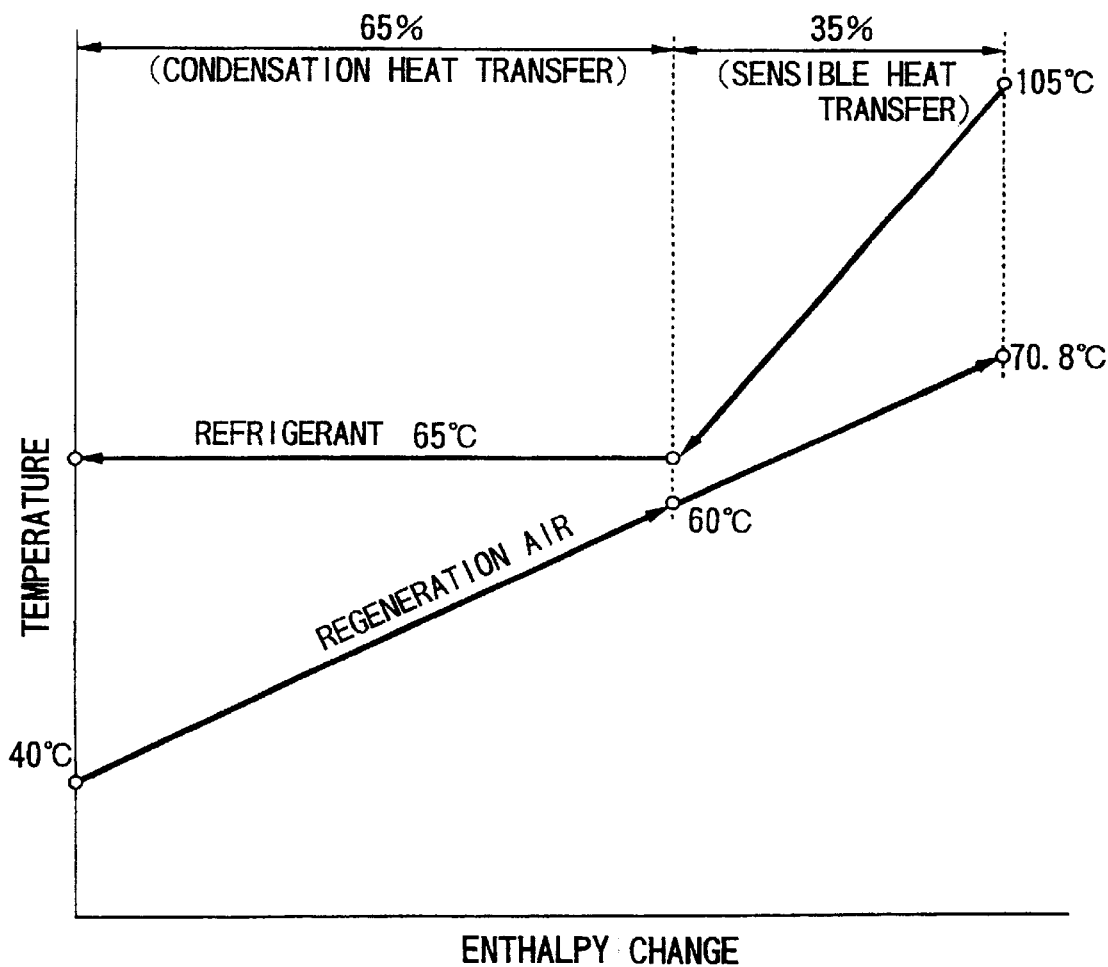
FIG. 9 is a graph showing a relation between the temperature and the enthalpy changes in the regeneration air and the high pressure refrigerant in a heat pump acting as a high-temperature source in the system shown in FIG. 6.

FIG. 9 is a graph showing relationships between temperature and enthalpy changes in the regeneration air and in the high pressure refrigerant of the heat pump serving as a high temperature source for the system shown in FIG. 6. When the refrigerant and the regeneration air exchanges heat, changes in the enthalpy for refrigerant and regeneration air are the same because input and output heat are balanced. Also, air undergoes an approximately constant specific heat sensible heat change process so that the graph is a continuous straight line, in the figure, and the refrigerant undergoes latent as well as sensible heat change processes, so that the latent heat portion of the graph becomes horizontal. Therefore, if the temperature at the regeneration air outlet is decided, the temperature of regeneration air at the outlet of the sensible heat exchanger 230 can be calculated from thermal balance, regardless of the temperature of the heated refrigerant vapor taking part in the heat transfer.

Therefore, in FIG. 9, when the refrigeration cycle is as shown in FIG. 7, the temperature of the regeneration air at the inlet to the condenser 220 is 40° C. and the refrigerant condensation temperature is 65° C., assuming the condenser 220 in the heat pump to be operating at a thermal efficiency of 80%, the present system produces a temperature Ts at a state S to be:

$$Ts = 40 + (65-40) \times 80/100 = 60° \text{ C.}$$

If the regeneration air is heated with about 35% of the total heat with the superheated vapor, the temperature Tt at a state T is give by:

$$Tt = 60 + 20 \times 35/65 = 70.8° \text{ C.}$$

Therefore, regeneration air is heated to a temperature which is 5.8° C. higher than the condensation temperature of 65° C.

As before, it should be noted that exhaust air from room air conditioning process has widely been used for desiccant desorption, and in the present embodiment, such a process may be applied to achieve the same effect.

Figure 10:
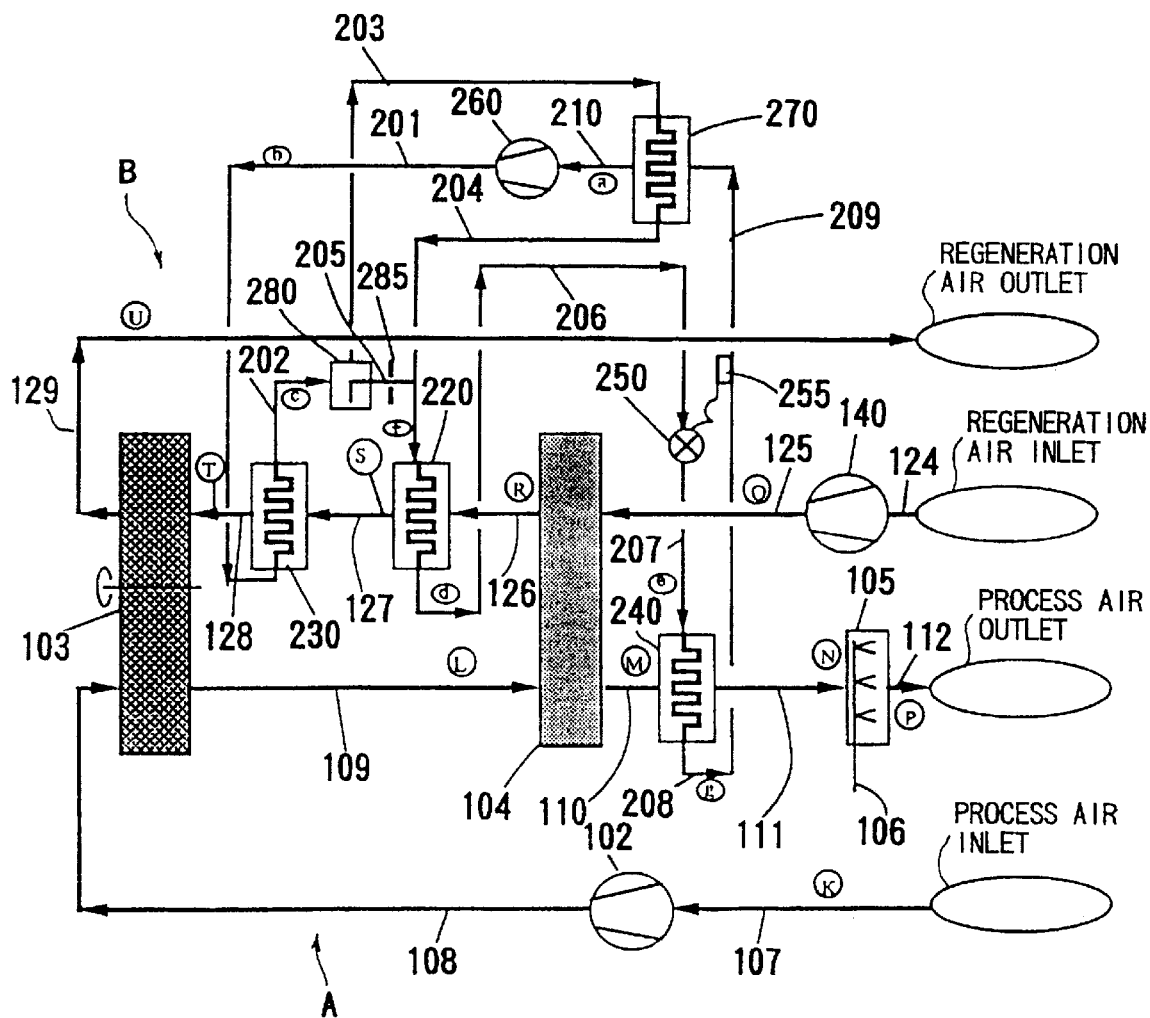
FIG. 10 is a schematic drawing of the basic system in a fifth embodiment.
Figure 11:
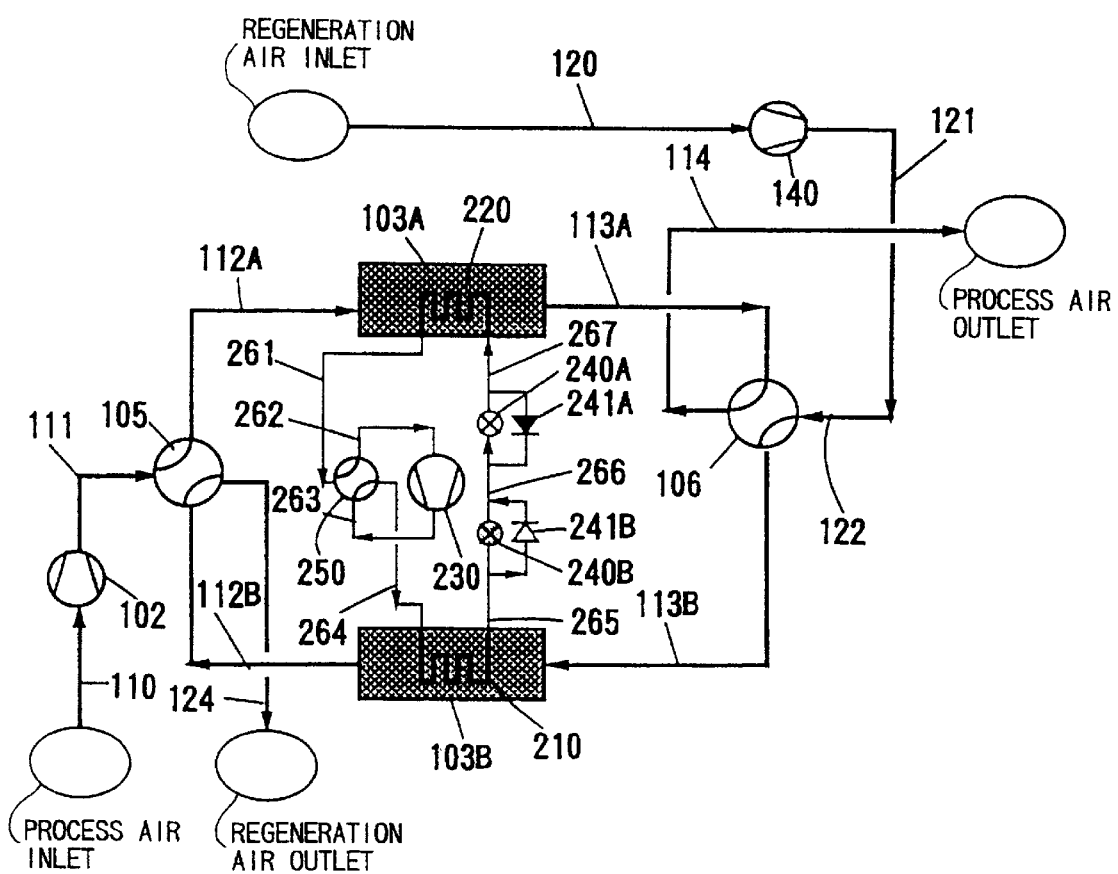
FIG. 11 is a schematic drawing of a conventional air conditioning system.

FIG. 10 shows a fifth embodiment. In this system, the vapor compression heat pump section is comprised by: a compressor 260; a low temperature heat exchanger (evaporator) 240; a first high temperature heat exchanger (sensible heat exchange) 230; a second high temperature heat exchanger (condenser) 220; an expansion valve 250; to constitute a refrigeration cycle: in addition, the refrigeration cycle further includes a refrigerant heat exchanger 270, in the passage between the low temperature heat exchanger (evaporator) 240 and the compressor 260, so that the high pressure wet refrigerant vapor exiting from the sensible heat exchanger 230 flows into the condenser 220 after performing heat exchange with the pre-compressor low pressure refrigerant. These aspects of this system is the same as those in the fourth embodiment; however, in this system, the high pressure refrigerant vapor exiting the sensible heat exchanger 230 is split into two passages in a vapor/liquid separator 280, so that the passage for the vapor phase is led to the refrigerant heat exchanger 270 through a passage 203, and that the passage for the liquid phase is provided with a constrictor 285 to lead to a passage 205, which is merged with a passage 204 for the high pressure refrigerant exiting the refrigerant heat exchanger 270, the merged path is led to the condenser 220. Other heat exchange processes are the same as those in the forth embodiment: i.e., in the evaporator 240, low pressure wet refrigerant vapor exchanges heat with post-desiccant 103 process air; in the sensible heat exchanger 230, pre-desiccant regeneration air exchanges heat with superheated refrigerant vapor; and in the condenser 220, high pressure wet refrigerant vapor exchanges heat with regeneration air yet to enter sensible heat exchanger 230.

The mechanism in the air circulation side of the system is the same as that in the previous embodiments, therefore, only the differences in the refrigeration cycle will be explained in the following.

In the fifth embodiment, the high pressure refrigerant vapor (which is almost in a dry, saturated state) exiting the sensible heat exchanger 230 is split into two paths in the vapor/liquid separator 280. The vapor is led through the vapor path to the refrigerant heat exchanger 270 to perform heat exchange with the dry, saturated low pressure refrigerant, which has not yet entered into the compressor, and is condensed therein. The amount of refrigerant condensed in the refrigerant heat exchanger 270 is small, because the low pressure refrigerant to be heated has a low specific heat and the heat exchange process is sensible such that the temperature does not rise beyond the condensation temperature providing only a limited amount of heat transfer. Therefore, not all the vapor is condensed, and the liquid amount represents less than 20% of the refrigerant outflow rate from the compressor. Therefore, a small amount of high pressure refrigerant is needed to be supplied to the refrigerant heat exchanger 270 so that piping diameter in this path can be small.

For the liquid path from the vapor/liquid separator 280, about 80% of the outflow rate from the compressor can be bypassed directly into the condenser 220. For the desiccant-assisted air conditioning system arrangement, it is desirable that the sensible heat exchanger 230 and the condenser 220 be located nearby. Therefore, the arrangement of directly supplying about 80% of the compressor refrigerant outflow to the condenser 220 by bypassing the refrigerant heat exchanger 270 is effective in reducing the cost of piping. If there is no resistance is provided in the passage 205, almost all of the refrigerant will bypass the refrigerant heat exchanger 270, therefore, it is necessary to adjust the bypass flow rate ratio by providing the constrictor 285. However, the bypass rate adjustment need not be strict, and even if a large flow rate of refrigerant is directed to the refrigerant heat exchanger 270, system performance would not be affected because the heat transfer is limited as explained above.

Accordingly, by separating a dry and saturated refrigerant vapor in the vapor/liquid separator for use in increasing the degree of superheating of the refrigerant at the compressor inlet, the amount of high pressure refrigerant flowing through the refrigerant heat exchanger can be lowered, so that that the size of the piping and the refrigerant heat exchanger in the refrigerant circuit can be reduced. Further, by providing a constrictor in the liquid path of the vapor/liquid separator, it becomes possible to secure a differential pressure between the inlet and outlet passage for the vapor phase of the high pressure refrigerant in the refrigerant heat exchanger, therefore, even if the refrigerant heat exchanger is remote from the sensible heat exchanger 230 and the condenser 220, a dry, saturated high pressure refrigerant vapor can be steadily delivered to the refrigerant heat exchanger 270.

Here, if a commercially available refrigerant compressor is to be used as a compressor 260 in the present invention, most of such commercially available refrigerant compressors utilize the inflow refrigerant to cool the drive motor of the compressor, so that overheating of the motor may be a concern, but counter measures can be taken to cool the motor by circulating low pressure saturated refrigerant in a jacket formed around the motor or by spraying the refrigerant.

INDUSTRIAL APPLICABILITY

The present invention is suitable for use as an air conditioning apparatus in usual residential buildings or larger buildings for use as super market stores, offices or facilities for public use or the like.

What is claimed is:

1. An air conditioning system comprising:
   a process air passage for flowing process air;
   a regeneration air passage for flowing regeneration air;
   a desiccant device which can be selectively communicated with either said process air passage or said regeneration air passage; and
   a heat pump device for supplying a heating heat for regenerating said desiccant device to said regeneration air, said heat pump device having a compressor and workable on process air as a low temperature heat source and regeneration air as a low temperature heat source,
   wherein regeneration air is split into two passages upstream of said desiccant device, so that a portion of said regeneration air flows through one of said two passages and another portion of said regeneration air flows through another of said two passages, and superheated vapor of a compressed refrigerant flowing out from said compressor is used to heat said other portion of said regeneration air in said other of said two passages upstream of said desiccant device.

2. An air conditioning system according to claim 1, wherein said refrigerant flowing into said compressor of said heat pump device is heated with a saturated vapor of compressed refrigerant to raise a temperature of compressed refrigerant.

3. An air conditioning system according to claim 2, wherein said system comprises at least two heat exchangers so that said outflowing refrigerant from said compressor flows successively from said first high temperature heat exchanger into said second high temperature heat exchanger, and said refrigerant flowing into said compressor is heated by heat exchange with a refrigerant flowing in a refrigerant passage, which communicates said first high temperature heat exchanger with said second high temperature heat exchanger.

4. An air conditioning system according to claim 2, wherein said system comprises at least two heat exchangers so that said outflowing refrigerant from said compressor flows successively from said first high temperature heat exchanger into said second high temperature heat exchanger, and a refrigerant heat exchanger is provided in a low pressure refrigerant passage communicating a low temperature heat exchanger of said heat pump device with said compressor such that said refrigerant flowing into said compressor is heated through heat exchange with said refrigerant flowing in other passage of said refrigerant heat exchanger which is led from a high pressure passage which communicates said first high temperature heat exchanger with said second high temperature heat exchanger.

5. An air conditioning system according to claim 2, wherein said system comprises at least two heat exchangers so that said outflowing refrigerant from said compressor flows successively from said first high temperature heat exchanger into said second high temperature heat exchanger, wherein a refrigerant heat exchanger is provided in a low pressure refrigerant passage which communicates a low temperature heat exchanger of said heat pump device with said compressor, and wherein a vapor/liquid separator is provided in a high pressure passage which communicates said first high temperature heat exchanger with said second high temperature heat exchanger, such that a vapor phase of said refrigerant is separated in said vapor/liquid separator and is led to said refrigerant heat exchanger to condense.

6. An air conditioning system according to claim 5, wherein a high pressure vapor passage from said vapor/liquid separator is communicated with said refrigerant heat exchanger, and a constrictor device is provided in a liquid passage from said vapor/liquid separator such that said passage beyond said constrictor device is merged with said high pressure refrigerant vapor passage beyond said refrigerant heat exchanger and a merged passage is communicated with said second high temperature heat exchanger of said heat pump device.

7. An air conditioning system comprising:

a process air passage for flowing process air;

a regeneration air passage for flowing regeneration air;

a desiccant device which can be selectively communicated with either said process air passage or said regeneration air passage; and a heat pump device for supplying a heating heat for regenerating said desiccant device to said regeneration air, said heat pump device having a compressor and workable on process air as a low temperature heat source and regeneration air as a low temperature heat source, wherein superheated vapor of a compressed refrigerant flowing out from said compressor is used to heat a portion of said regeneration air in said regeneration air passage upstream of said desiccant device, and wherein said system is constructed such that said desiccant device is communicable with at least a first passage region for performing dehumidification of said process air, a second passage region for performing a first regeneration process of said desiccant device and a third passage region for performing a second regeneration process of said desiccant device, and said desiccant device is designed so that a desiccant material sequentially passes said first, second and third passage regions; said high temperature heat source of said heat pump device is comprised by at least two heat exchangers so that said outflowing refrigerant from said compressor flows successively from a first high temperature heat exchanger into a second high temperature heat exchanger among said heat exchangers; and regeneration air, after flowing through said second high temperature heat exchanger, is split into two passages so that a portion of said regeneration air flows through one of said two passages into said second passage region to perform said first regeneration process, and a remaining portion of said regeneration air, after flowing through said first high temperature heat exchanger, passes through another of said two passages into said third passage region to perform said second regeneration process.

8. An air conditioning system according to claim 7, wherein said desiccant device is formed as a rotator.

9. A desiccant assisted air conditioning system comprising:

a process air passage for flowing process air;

a regeneration air passage for flowing regeneration air;

a desiccant device which can be selectively communicated with either said process air passage or said regeneration air passage; and a heat pump device for supplying a heating heat for regenerating said desiccant device to said regeneration air, said heat pump device having a compressor and workable on process air as a low temperature heat source and regeneration air as a high temperature heat source, wherein said refrigerant flowing into said compressor of said heat pump device is heated with a saturated vapor of compressed refrigerant to raise a temperature of compressed refrigerant so as to enhance said heating ability for heating said regeneration air.

10. An air conditioning system according to claim 9, wherein said system is constructed such that said desiccant device is communicable with at least a first passage region for performing dehumidification of process air, a second passage region for performing regeneration process of said desiccant device, and said desiccant device is designed so that a desiccant material sequentially passes said first and second passage regions; that said high temperature heat source of said heat pump device is comprised by at least two heat exchangers so that said outflowing refrigerant from said compressor flows successively from a first high temperature heat exchanger into a second high temperature heat exchanger; that regeneration air flows successively from said second high temperature heat exchanger to said first high temperature heat exchanger, and then flows through said second passage region; and that and a refrigerant heat exchanger is provided in a low pressure refrigerant passage communicating a low temperature heat exchanger of said heat pump device with said compressor such that said refrigerant flowing into said compressor is heated through heat exchange with said refrigerant flowing in other passage of said refrigerant heat exchanger which is led from a high pressure passage which communicates said first high temperature heat exchanger with said second high temperature heat exchanger.

11. An air conditioning system according to claim 10, wherein said desiccant device is formed as a rotator.

12. An air conditioning system according to claim 10, wherein a vapor/liquid separation device is provided in a high pressure refrigerant passage, communicating said first high temperature heat exchanger to said second high temperature heat exchanger, so that a vapor phase of said refrigerant is separated and led into said refrigerant heat exchanger to condense so as to provide heat to said refrigerant flowing into said compressor.

13. An air conditioning system according to claim 12, wherein a high pressure vapor passage from said vapor/liquid separator is communicated with said refrigerant heat exchanger, and a constrictor device is provided in a liquid passage from said vapor/liquid separator such that said passage beyond said constrictor device is merged with said high pressure refrigerant vapor passage beyond said refrigerant heat exchanger and a merged passage is communicated with said second high temperature heat exchanger of said heat pump device.

* * * * *